United States Patent [19]

Loshbough et al.

[11] Patent Number: 5,002,141
[45] Date of Patent: Mar. 26, 1991

[54] VEHICLE WEIGHING IN MOTION APPARATUS AND METHOD

[75] Inventors: Richard C. Loshbough, Westerville; Donivan L. Hall, Worthington, both of Ohio

[73] Assignee: Toledo Scale Corporation, Worthington, Ohio

[21] Appl. No.: 447,795

[22] Filed: Dec. 8, 1989

[51] Int. Cl.⁵ .................. G01G 3/14; G01G 13/16; G01G 19/02; G01L 25/00
[52] U.S. Cl. ..................... 177/210 FP; 177/25.14; 177/134; 73/16
[58] Field of Search ............ 177/134, 135, 185, 25.14, 177/163, 210 FP; 73/16

[56] References Cited
U.S. PATENT DOCUMENTS

| 4,049,069 | 9/1977 | Tamamura et al. | 177/134 |
| 4,539,650 | 9/1985 | Griffin et al. | 177/136 X |
| 4,701,866 | 10/1987 | Harrison et al. | 177/163 X |
| 4,804,052 | 2/1989 | Griffen | 177/50 X |

Primary Examiner—George H. Miller, Jr.

[57] ABSTRACT

A weighing in motion (WIM) apparatus and method in which scale platforms are provided exhibiting a high rigidity selected to achieve a relatively high natural frequency response characteristic. These platforms are combined with instrumentation wherein load cell derived signal outputs are digitized at a conversion or sampling rate effective to permit an identification of amplitude data correlative to vehicle weight. In particular, the sampling rate is selected so as to isolate and detect peak amplitude output of the system which is directly correlatable to truck weight. The invention derives from a recognition that, during the dynamics of movement of a vehicle such as a truck over the rigid scale platform structures, there occurs a decoupling of the mass of the truck from the scale permitting its response to the weight of the truck without significant loss of natural frequency bandwidth. Through the use of a high speed processor such as a digital signal processor (DSP) essentially real time weight evaluations can be carried out.

32 Claims, 14 Drawing Sheets

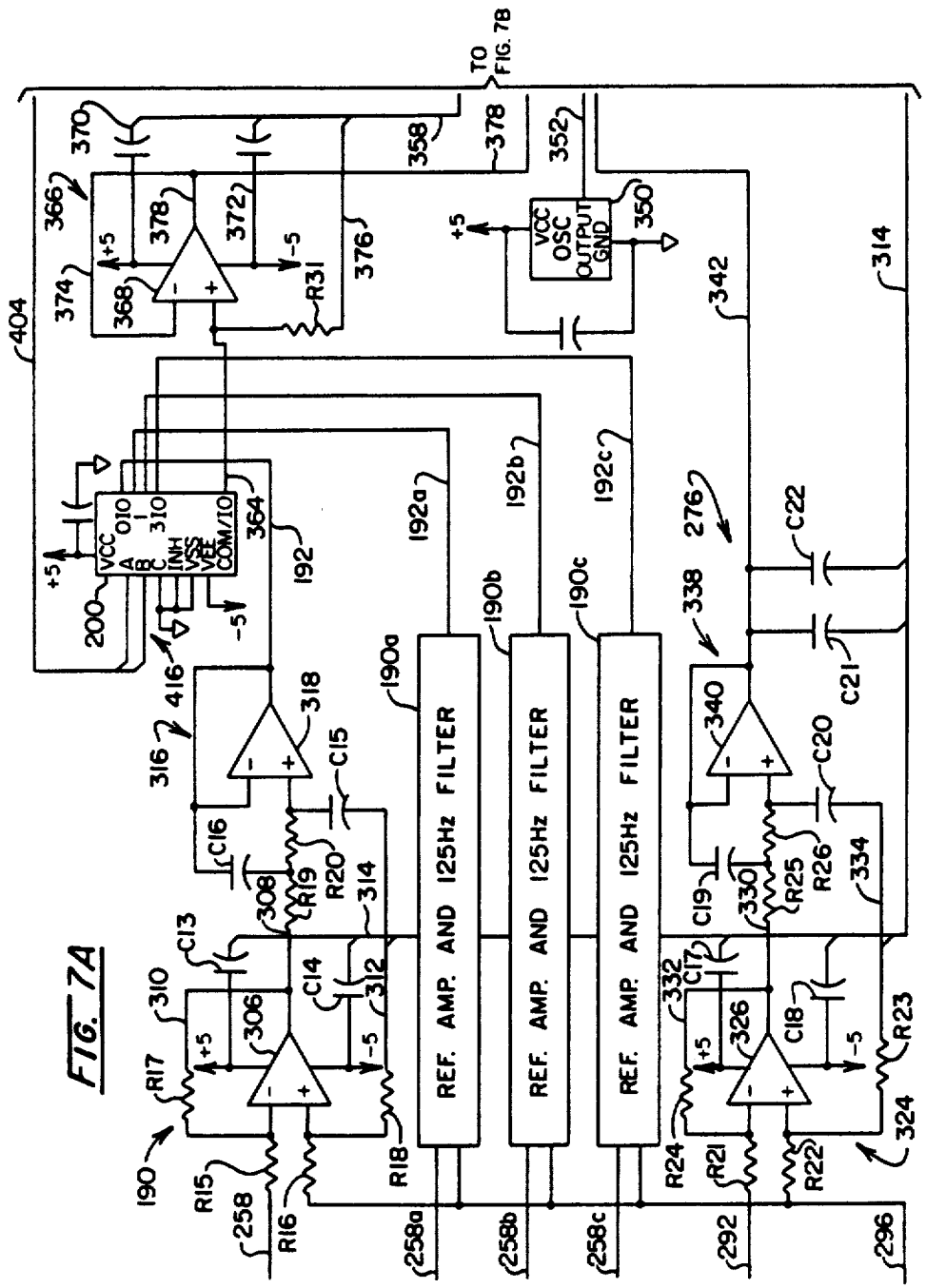

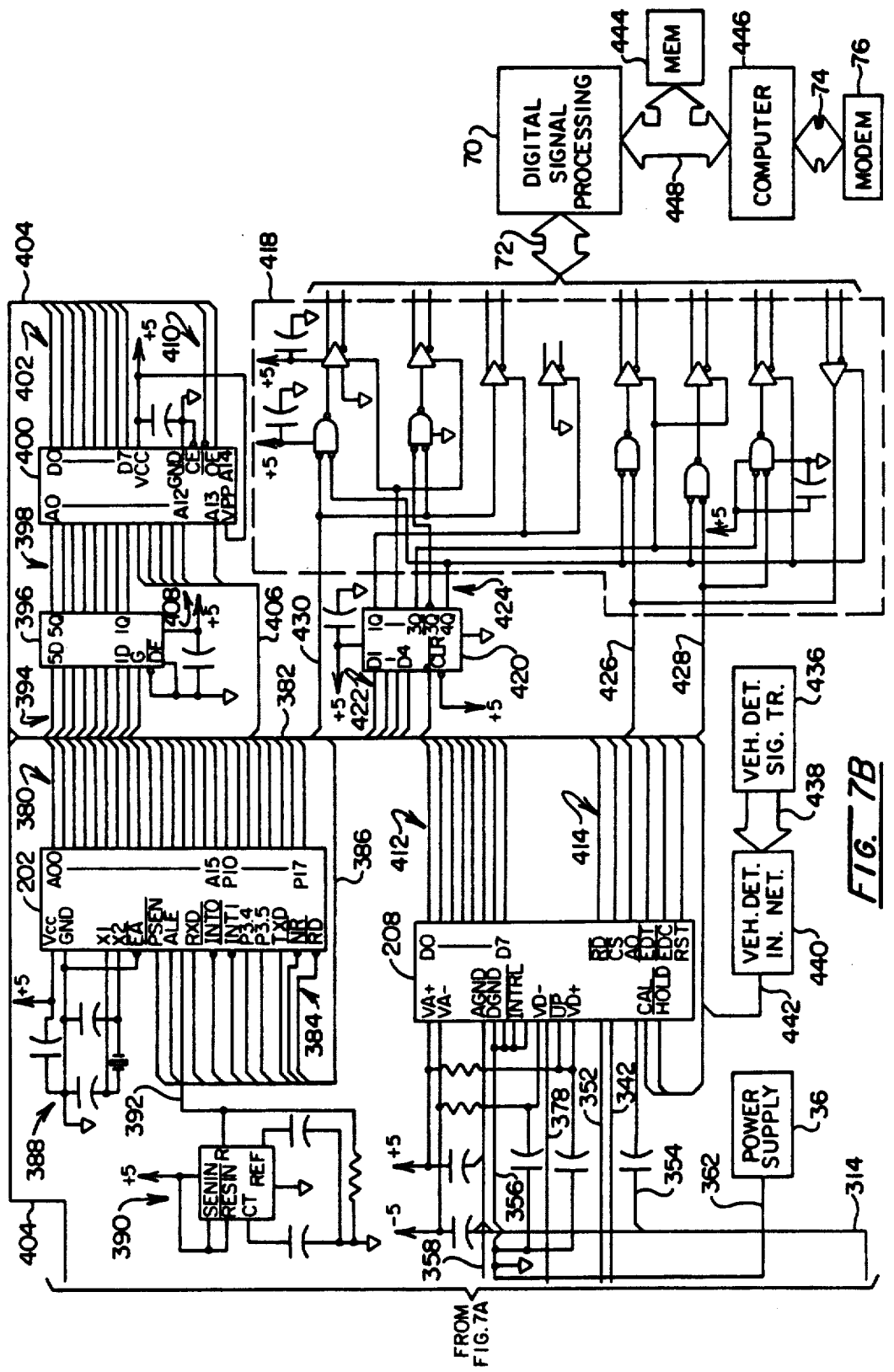

VEHICLE WEIGHING IN MOTION APPARATUS AND METHOD

BACKGROUND OF THE INVENTION

Government entities charged with the maintenance and development of numerous facets of the national infrastructure have long been concerned with the deterioration of highway pavement. Generally, it is known that a strong relationship exists between highway damage factors and the axle loadings of heaver commercial vehicles. Thus, a high level of interest resides in the development of systems capable of carrying out an effective evaluation of vehicle weights as well as other data. For example, a study sponsored by the Transportation Research Board of the National Research Council indicates that state governments are spending in excess of $25,000,000.00 annually on heavy vehicle data collection programs.

Traditionally, truck weighing has been carried out using small, portable wheel scales carried by law enforcement personnel or vehicle weight survey specialists. More elaborate and safer weighing procedures are associated with fixed weigh stations located adjacent major highways and providing truck access by on-and off-ramp structures. Such weighments are static in that the vehicle is stopped and at rest during the procedure. The use of portable scales currently is minimal with respect to data accumulation and the static weighing operations at fixed weigh stations represent a limited data source for pavement deterioration studies. In the latter regard, overloaded trucks will avoid traveling highway sections at which the scales are located. Further, during intervals of high density traffic, trucks will tend to queue in the approach ramps to the weigh stations, resulting in unsafe highway conditions.

In view of the limitations in data collection established by existing heavy vehicle static weighing systems, investigators have sought techniques for achieving acceptably accurate traffic loading evaluations while vehicles are in motion. Weigh-in-Motion (WIM) systems, if effectively operative, hold promise to minimize the universal scale avoidance problem generated by driver awareness of scale location; reduce weighing cost per truck; and generally improve the quantity and quality of data and resultant statistical accuracy.

To the present time, WIM installations have been limited in both accuracy and in capability with respect to vehicle speed. In contemplating the design of a WIM scale facility, the investigator necessarily is confronted with the requirement that the scale be sufficiently robust to withstand the dynamics associated with the passage thereover of a number of heavy trucks at speeds up to 70 mph. To accommodate for such dynamics, weigh bridge structures of substantial mass and strength have been developed. Unfortunately, dynamic test studies have demonstrated that weigh bridge natural resonances as exhibited by such robust structures are in the 30 Hz range; a level much too low to make accurate, speed defining WIM weight determinations. In the latter regard, it is observed that the time of tire dwell on, for example about a 30 inch scale platform, at a WIM speed of 55 mph is on the order of 25 to 30 milliseconds. Accordingly, scale response for the systems thus contemplated will be too slow to develop practical weighing signals. Such physical factors being known, investigators have been confronted with the prospect of generating highly complex correlation algorithms seeking to achieve an in motion scale calibration, an error prone task fraught with uncertainties.

SUMMARY

The present invention is addressed to a method and apparatus for weighing vehicles in motion which achieves requisite weighing accuracies while performing substantially independently of vehicle speed. This highly desirable performance stems from investigatory activities undertaken utilizing a test scale installation on Interstate Route I-270 at a location east of the city of Columbus, Ohio. The test scale installation was designed in the manner of a research tool for purposes of affording investigators broad latitude for data selection and generation. For instance, the scale contained redundant, spaced weighing platforms or bridges to provide two weighments along each vehicle wheel track. These platforms, in turn, were configured with non-damping suspensions; were of relatively light weight and high rigidity; and were stabilized to highway conditions by a preloading feature. Thus, the platforms exhibited a high platform natural resonance or broad band width characteristic. To achieve maximized data collection, output signals from the load cell based counterforce system of the platform were digitized at very high sampling or update rates, i.e. at a rate of 3,000 updates per second for each of the scale platforms.

Preliminary inpulse tests carried out upon a platform in conjunction with predetermined static loadings positioned thereon showed a desired high natural frequency response at a zero static load. However, as the test continued with the application of loads of increasing static mass, an expected mass imposed lowering of platform resonant frequency ensued. This result occurred essentially in accordance with the known relationship of structural mass with resonant frequency wherein natural resonant frequency varies inversely with the square root of the mass of the scale structure. It is therefore logical to anticipate that, as the mass represented by a truck moves over a scale, the same principle would apply, scale resonant frequency diminishing to severely complicate the extraction of weight data.

As testing commenced with the movement of test trucks over the test scale system, resulting data showed that the scale platform resonance was significantly higher than anticipated. Further evaluation of the data showed a direct correlation between the peak amplitudes measured at the high sampling rates and static truck weight characteristics. This unexpected result held true for vehicle speed variations and a generally equivalent relationship could be found for the output of the scale under static calibrating loads and resultant dynamic or WIM weighments.

Another aspect of the invention is to provide a method for deriving the value of the weight of a vehicle while in motion along a given path and being movably supported by wheels in contact with a surface. The method comprising the steps of:

providing a scale having a weighing platform at the surface exhibiting a select minimum natural resonant frequency and positioned to receive the wheel in weighing relationship during the vehicle motion;

providing instrumentation operatively associated with the scale having output signals of amplitude variable in response to the imposition of force upon the weighing platform;

calibrating the scale by statically applying a known weight to the weighing platform and correlating corresponding said output signals thereto to derive a calibrating datum;

acquiring the output signals in response to the movement of the vehicle wheel over the weighing platform;

determining a weight equivalent value as a predetermined characteristic of the acquired output signals substantially independent of the velocity of the vehicle over the scale;

deriving the value of the weight of the vehicle by correlating the weight equivalent value with the calibrating datum; and outputting said weight value to a readout.

Another feature of the invention provides apparatus for determining the weight of a vehicle while in motion along a given path, such vehicle being movably supported by wheels in contact with a surface, the apparatus comprising a scale having a weighing platform locatable at the surface and along the path in an orientation for receiving a wheel in weighing relationship, the platform being configured to exhibit a minimum natural frequency effective to transmit substantially all dynamic force imposed thereon by the vehicle through the wheel. Instrumentation is provided which is operatively associated with the scale weighing platform and has output signals of amplitude variable in response to the dynamic force. A control arrangement is provided which includes memory for retaining a calibrating datum acquired in response to the static application of a known calibrating weight to the weighing platform. The control further is responsive to the output signals representing the presence of the wheel in movement upon the platform for deriving the weight equivalent value of the dynamic force substantially independent of the velocity of the vehicle and is responsive to derive the value of the vehicle weight as a correlation of the calibrating datum with the derived weight equivalent value.

Another feature of the invention provides a method for determining the weight of a vehicle while in motion, the vehicle being supported by pneumatic wheels for movement upon a surface along a given path, comprising the steps of:

providing a scale having a weighing platform at the surface exhibiting a select minimum natural frequency and positioned to receive a said wheel in weighing relationship during the vehicle motion;

providing instrumentation operatively associated with the scale having output signals variable in response to the imposition of a force to be weighed upon the weighing platform;

acquiring the output signals corresponding to the movement of the wheel upon the weighing platform;

converting the output signals to digital values at a sampling rate selected as effective to derive a select digital value correlative of the weight imposed by the wheel upon the weighing platform substantially independent of velocity of the vehicle;

acquiring the select digital value; and converting the select digital value to a weight value by application of a calibrating factor thereto.

Other objects of the invention, will, in part, be obvious and will, in part, appear hereinafter.

The invention, accordingly, comprises the method and apparatus possessing the construction, combination of elements, arrangement of parts, and steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 5A is an electrical schematic representation of a strain gauge configuration for a load cell employed with the instrumentation revealed in FIG. 5;

FIGS. 7A and 7B combine in the manner labeled thereon to provide an electrical schematic diagram of control features of the invention;

DESCRIPTION OF THE INVENTION

Figure 1:
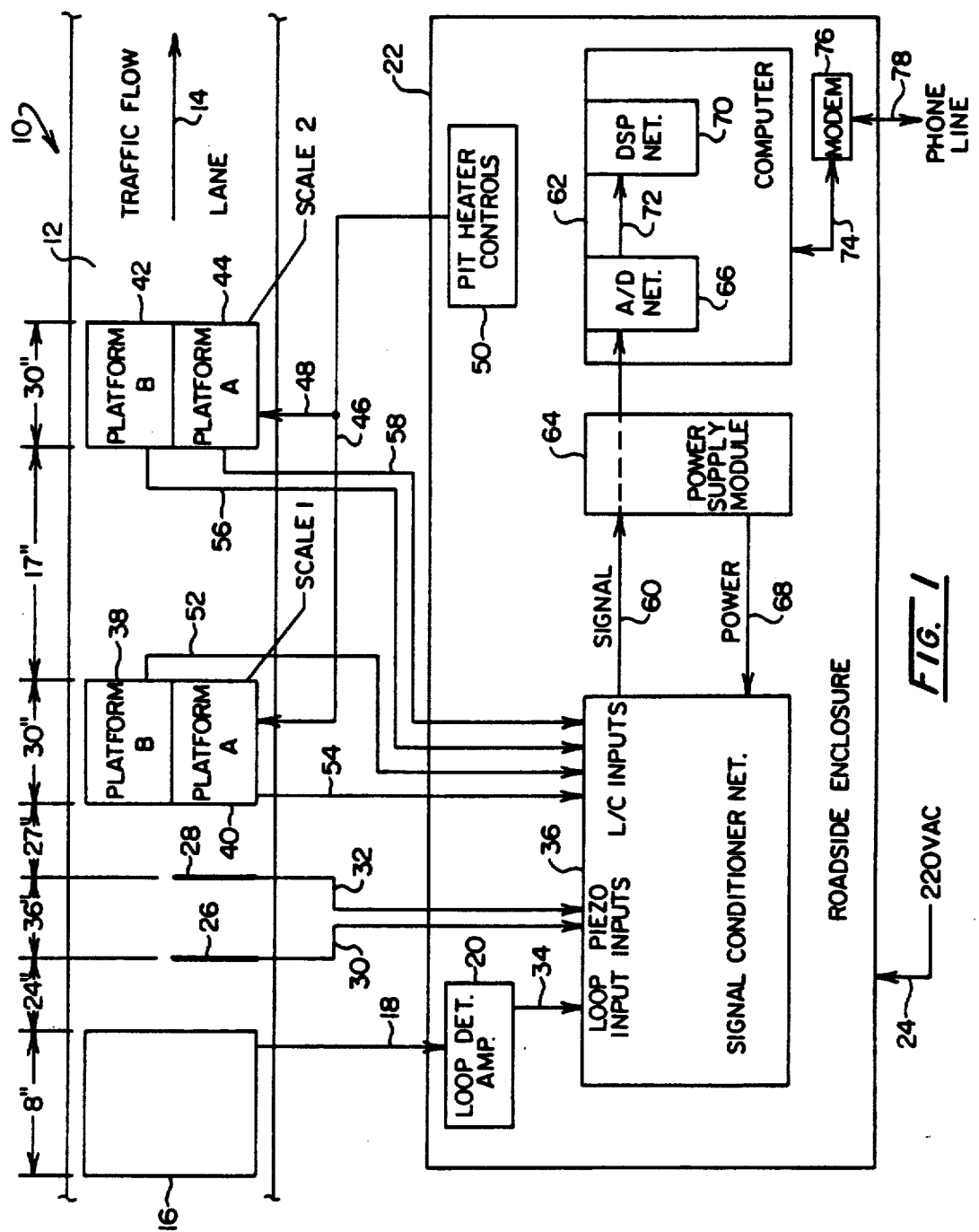
FIG. 1 is a schematic diagram of a test scale facility.

The test scale facility with which data were developed leading to the discovery generating the present invention is revealed in general at 10 in the schematic representation of FIG. 1. Components comprising the facility 10 were positioned within one lane of the multi-laned highway identified as route I-270. This concrete highway structure was paved with a higher level of smoothness than conventionally formed at the approach region to the test facility to provide an avoidance of the oscillatory dynamics of bouncing of the vehicles as they approached. In the figure, the lane is represented at 12 and the direction of traffic flow is represented by the arrow 14. As truck vehicles approach the facility 10, they first encounter a loop detector 16 having the dimensions shown which essentially extends across the 12-foot wide lane 12 and is flux responsive to the extent of being capable of detecting the presence of a vehicle at its location. The output of this loop detector is represented at line 18, extending, in turn, to a block 20 representing a loop detection amplification feature of a control system depicted within block boundary 22. During the test procedures carried out, the control system 22, in effect, was housed within a roadside enclosure having appropriate environmental controls and the like, and was serviced from an a.c. input utility line represented at arrow 24. Next positioned at the surface of the lane 12 are two linear, spaced piezoelectric speed detectors 26 and 28. Detector 26 is seen spaced 24 inches from the exiting side of loop detector 18 and is, in turn, spaced 36 inches from detector 28. These detectors provide an output signal upon the passage of a vehicle wheel over them and the inputs therefrom are shown, respectively, at lines 30 and 32, extending along with the output at line 34 of amplifier function 20 to a signal conditioner network represented at block 36. Network 36 functions in conventional manner to provide initial amplification and filtering of the inputs asserted thereto. The piezoelectric devices 26 and 28 provide not only presence and absence information but also, by virtue of the interval between wheel strikes at devices 26 and 28, speed and wheel spacing information.

The wheels of a vehicle entering test site 10 next encounter a first pair of scale weighing platforms as represented at 38 and 40, referred to as "Scale 1". The upper surfaces of these platforms 38 and 40 are mounted such that they are flush with the top surface of the highway lane 12. In order to provide a broad bandwidth of natural frequency or resonance to these scale platforms 38 and 40, they were constructed under design criteria calling for high rigidity and light weight while remaining suitably rugged to withstand the rigors of a highway. To accommodate for the suction effects and the like of vehicles passing over the platforms, they were preloaded to the extent of about 1400 pounds. In general, the instrumentation for each of the platforms comprised four load beam configured load cells, each of which were instrumented with bridge configured strain gauges in conventional manner.

Spaced 17 feet from platforms 38 and 40 are two additional such platforms as at 42 and 44 functioning to provide a next scale represented in the figure as "Scale 2". These weighing platforms 42 and 44 are structured in identical fashion as those at 38 and 40 and, as before, the upwardly disposed surfaces of them are mounted substantially flush with the corresponding surface of traffic lane 12. Note that the entrance to Scale 2, represented by platforms 42 and 44 is positioned 17 feet from the exit boundary of scales 38 and 40 of Scale 1. Temperature in terms of heating components is maintained within predetermined limits by heaters (not shown) positioned within the pits within which the Scales 1 and 2 are mounted and control over such environmental protection is represented by lines 46 and 48 extending, in turn, to a pit heater control function shown at block 50 within control system 22.

The strain gauge instrumentation of the load cells or load beams within each of the platform Scales 1 and 2 are shown providing output signals as at lines 52, 54, 56, and 58 which are directed to the signal conditioner network 36 within control system 22. These signals are appropriately amplified and filtered at network 36 and the various outputs of this network function are directed, as represented by arrow 60 to a computer function shown in general at block 62. In this regard, arrow 60 is shown passing through a power supply representation at block 64 and is directed specifically to an analog-to-digital conversion network represented by sub-block 66. Power supply module 64 also is shown providing a power input to the conditioner network 36 as represented at arrow 68.

Within the computer function represented at block 62, the analog-to-digital conversion function is carried out under microprocessor control at high rates. In this regard, the function provides an effective update or sampling rate of 12,000 samples per second which, in turn, represents 3,000 samples per second for each of the four platforms at Scales 1 and 2. This high sampling rate provides flexibility for achieving an adequately accurate extraction of peak or effective amplitude values from the output signals of the platforms at Scales 1 and 2. Conversion network 66 is provided as a board within a computer which is selected as being compatible with the AT version marketed by International Business Machines, Inc. This computer function, as represented at 62 also incorporates a digital signal processor (DSP) board or network as represented at sub-block 70. Network 70 serially receives digital information from converter network 66 as represented by line 72. Processor 70 may be provided, for example, as a type ZPB32-HS marketed by Burr-Brown Corporation of Tucson, Ariz. This device is a full-size processor board suited for implementation within a PC-type computer of the type employed within function 62. The DSP device contains an AT&T WE DSP 32 floating point DSP processor, 64K local RAM, and buffered high-speed serial I/O ports. The device is capable of up to 25,000,000 floating point operations per second and, therefore, enjoys the ability to perform real-time digital filtering of the signals presented thereto. Data may be transferred to and from the device by the parallel bus or high speed serial bus of the computer function 62. Communication with computer function 62 may be provided in conventional manner, for example through visual readouts and interactive devices including keyboards. For remote operations typically involved with such facilities as at 10, it is convenient to provide telecommunications. In this regard, such communication is represented by dual arrow 74 directed to a modem function represented at block 76 which is coupled to a conventional telephone line represented at arrow 78.

Figure 2:
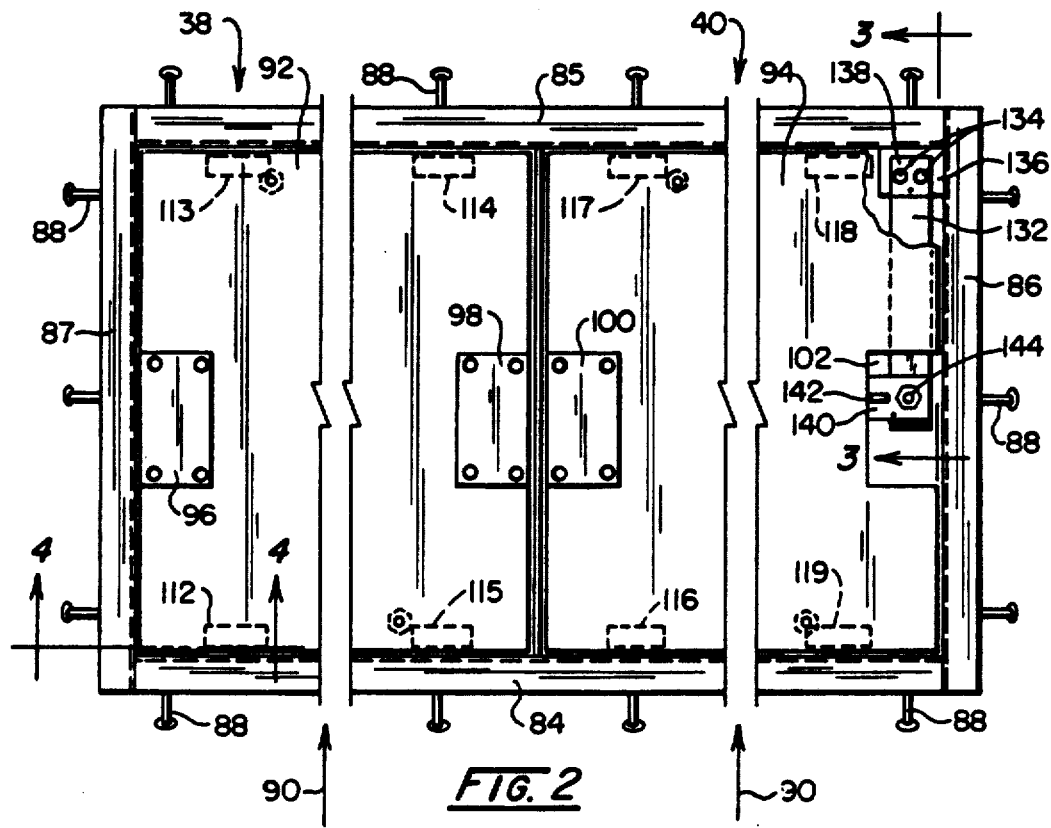
FIG. 2 is a top view of a paired platform scale employed at the facility of FIG. 1 with portions broken away to reveal internal structure.
Figure 3:
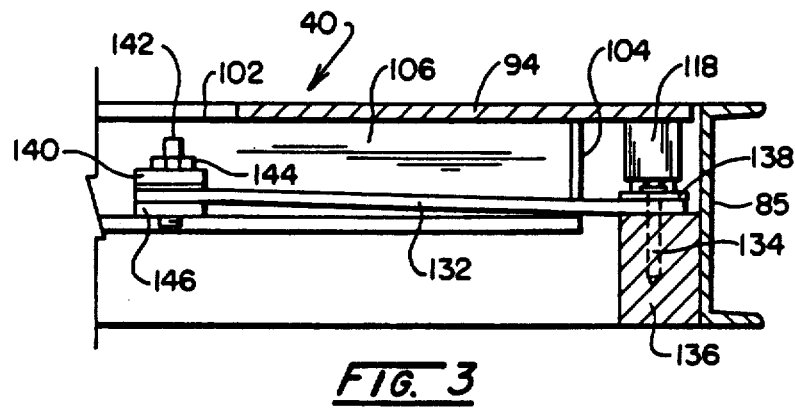
FIG. 3 is a partial sectional view taken through the plane 3—3 in FIG. 2.
Figure 4:
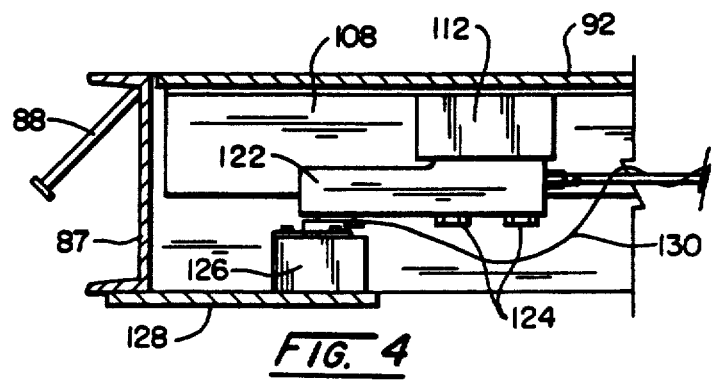
FIG. 4 is a partial sectional view taken through the plane 4—4 in FIG. 2.

Referring to FIGS. 2-4, the general structuring of the relatively light and highly rigid design of the weighing platforms of Scales 1 and 2 is revealed. In FIG. 2, the paired platforms 38 and 40 of Scale 1 are revealed in plan view fashion as represented by that same numerical identification. The scale is configured having a base mounted within the highway structure which is formed of a rectangular arrangement of channels including end channels 84 and 85 and side channels 86 and 87. These channels 84–86 are embedded within the concrete structure of the highway, appropriate anchoring being provided by outwardly and downwardly extending anchor components, certain of which are identified at 88. The base structure for paired platforms 38 and 40 is oriented to confront traffic moving along a pathway as represented by arrows 90. Platforms 38 and 40 are structured so as to reside within the pit defined by channel members 84–87, each such platform being essentially identically and symmetrically formed as including a top plate which is fixed to a rigid supporting box structure fashioned of plate and angle components. In this regard, the top plate for weighing platform 38 is represented at 92 and the corresponding top plate for platform 40 is shown at 94. Access covers as at 96 and 98 are provided in top plate 92, while, correspondingly, a similar structuring is provided to top plate 94. In FIG. 2, a cover is shown at 100, while the corresponding cover for the opposite side of the plate is represented as being removed to reveal an opening 102. FIGS. 3 and 4 reveal portions of the rigid box structuring supporting respective platforms 94 and 92. In this regard, an end plate 104 and angle component 106 are seen in FIG. 3 while an angle component 108 is seen in FIG. 4.

Weighing platforms 38 and 40 is configured such that the four corners of each is supported upon a load cell which may be configured, for example, as a load beam. The lateral load beams are each connected to a load cell mounting bar or block, the four blocks associated with platform 38 being revealed in phantom in FIG. 2 at 112–115. Correspondingly, the load cell mounting bars associated with platform 40 are represented in phantom at 116–119. Turning to FIG. 4, the load cell structuring associated with each of the mounting bars 112–119 is illustrated in conjunction with mounting bar 112. In the figure, the load beam is represented at 122 being connected to mounting bar 112 by bolts 124. The oppositely disposed end of beam 122 is shown as abuttably contacting a load pin attachment block 126, in turn, fixed to a side base plate extending from side channel 87. Strain gauges are mounted upon the load cell structure 122 and the output of this instrumentation is directed to the signal conditioner network 36 (FIG. 1) by cabling as represented at 130. Each of the weighing platforms as at 38 and 40 is preloaded through the employment of two hold-down flexures. Typically, these flexures will provide for the application of about a 1400 pound preload and this arrangement assures the security of the platform under the harsh environment of highway traffic. FIGS. 2 and 3 reveal one such flexure arrangement. In this regard, a flexure strut is shown at 132 connected by bolts 134 to a flexure attachment block 136. A clamp plate 138 is seen located intermediate bolts 134 and the top of strut 132. Strut 132 is seen additionally to extend slightly vertically upwardly in flexure to an attachment with the platform 40. This attachment is provided by a flexure attaching bar 140 coupled, in turn, to structural component 106 and supported by a vertical brace 142. A bolt as at 144 in association with a plate 146 having a threaded opening functions to attach the support to strut 132. Two such structures as represented at FIG. 3 are provided at opposite sides of each of the platforms 38 and 40.

Figure 5:
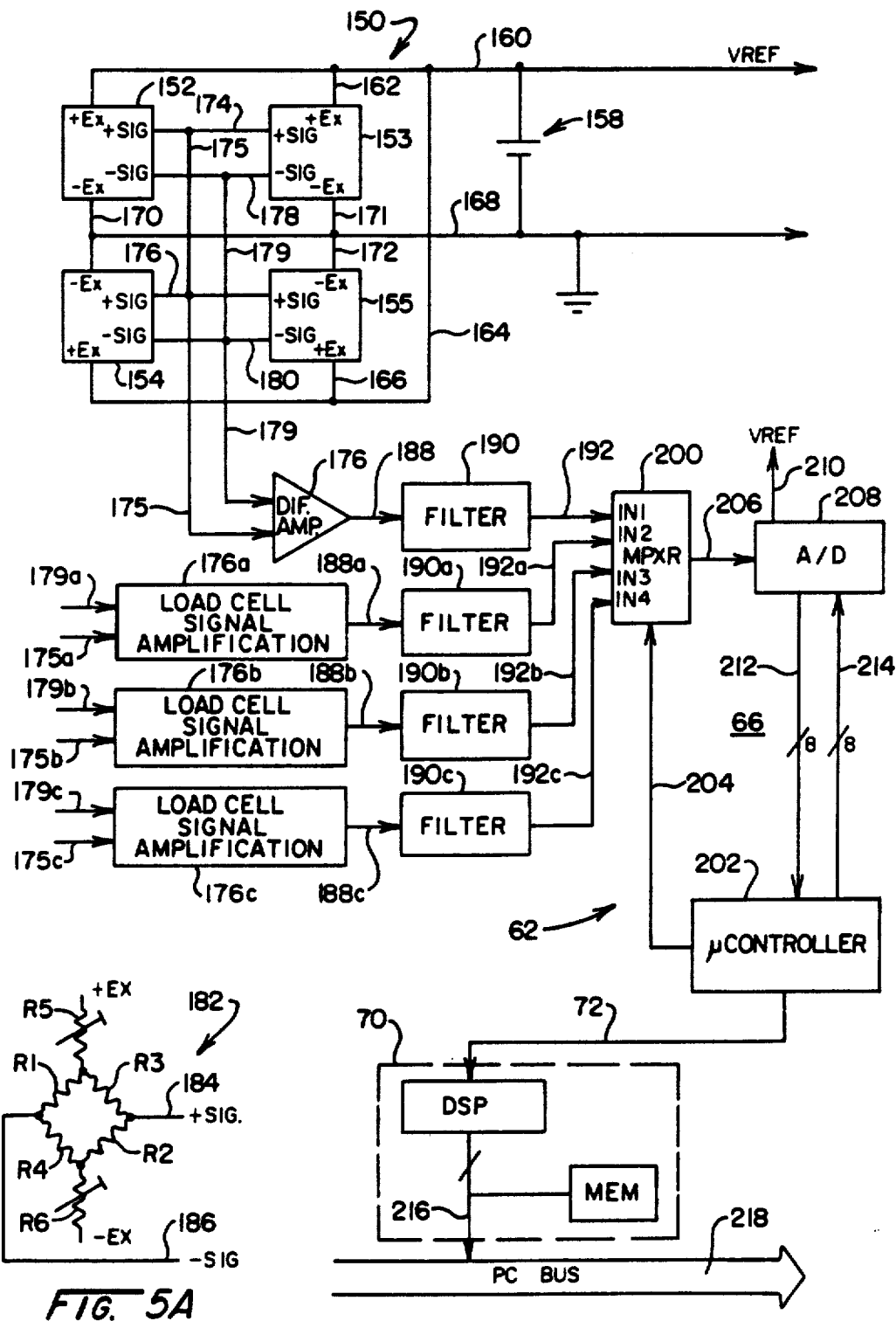
FIG. 5 is a block schematic diagram of the instrumentation and associated control employed with the facility of FIG. 1.

Referring to FIG. 5, a block diagrammatic representation of salient components of the control system is represented. In the figure, a strain gauge load cell array as may be employed, for example with one platform of a scale is represented in general at 150. The array 150 includes strain gauge bridge assemblies 152–155, each being depicted having positive and negative polarity excitation (EX) and signal (SIG) terminals. The excitation terminals are coupled to a d.c. load cell power supply herein represented as a battery 158. This coupling provides a parallel communication with power supply 158 as represented by voltage reference line 160 extending to the excitation terminal of strain gauge 152 and through line 162 to the corresponding terminal of strain gauge 153. The same supply input is provided to the positive excitation terminals for strain gauges 154 and 155 via lines 164 and 166. Ground input to the array 150 is developed as represented at line 168 and feeder leads 170–172. Typically, the power supply 158 asserts a 10 volt input to the array 150.

The positive polarity signal outputs (SIG) of strain gauges 152–155 are collected by lines 174–176 and directed via line 175 to one input of a differential amplifier function represented at 176. Correspondingly, the outputs of the signal terminals of opposite polarity are commonly coupled by lines 178–180 and directed via line 179 to the opposite input of differential amplifier function 176. In general, the output signals are of relatively low level, for example 10 mv at full scale.

Looking momentarily to FIG. 5A, the typical configuration of the strain gauge as at 152–155 is revealed in general at 182. The strain gauges of each unit are coupled in bridge fashion and are represented by resistors R1–R4. Oppositely disposed resistors R1 and R2 are, for example, located to respond to tensional strain, while resistors R3 and R4 are configured for responding to compressively induced strain. A d.c. power supply is applied through a variable resistor R5, while the power supply of opposite polarity is supplied to an excitation terminal through variable resistor R6. A resultant output is provided at the signal terminals represented at lines 184 and 186.

Returning to FIG. 5, the amplification function 176 serves to develop an amplified signal, for example exhibiting a 2 volt full scale output as represented at line 188. Line 188, in turn, is shown directed to an analog filtering function represented at block 190. Filtering function 190 is of a unity gain low pass variety (2-pole), serving to pass frequency elements up to the highest frequency of interest while blocking frequency elements at subsequent digitizing frequencies. For the instant application the frequency level selected also is near but above the natural resonant frequency of the scale platform at hand. For example, a 125 Hz value may be selected, a level well below the 3,000 Hz conversion rate of the analog-to-digital converter of the system. This output of filter 190 is represented at line 192.

For a four platform scale facility as at 10, four substantially identically structured channels are employed with the signal treatment circuitry. Accordingly, three additional such channels are shown having the same numerical designation for the components thereof as represented above for the initial channel but with alphabetical suffixes. In this regard, the combined strain gauge outputs earlier described at lines 175 and 179 are shown for an initial channel at 175a and 179a. These lines are shown directed to a load cell signal amplification function represented at block 176a which corresponds to the differential amplification function 176. The output from block 176a is represented at line 188a, carrying the 2 volt full scale output described in connection with line 188. Line 188a is seen directed to a 125 Hz two-pole low pass filter, the output of which is presented at line 192a.

In similar fashion, two additional channels are represented with the suffix "b" and the suffix "c".

These four channels of output are next directed to the control function earlier represented in general at 62. In particular, the four channels at lines 192 and 192a–192c are directed to a multiplexing function 200 through which they may be selected for conversion to digital format. In this regard, the multiplexer 200 is shown under the control of a microprocessor controller represented at block 202 via line 204. Thus, under the control of microprocessor controller 202, multiplexer 200 is caused to select the channels in a given sequence and present the outputs thereof as represented at line 206 to an analog-to-digital converter 208 functioning to carry out a 16 bit form of conversion in two increments representing higher and lower significant bits. Conversion by the converter 208 is carried out with respect to reference voltage values developed with respect to the load cell component supplies as represented at line 210 and earlier generally described at line 160. With such an arrangement, a ratiometric form of digital conversion ultimately is developed. The outputs of converter 208 are directed via 8-bit bus 212 to the control function 202. Correspondingly, control to the analog-to-digital converter function 208 is provided by an 8-bit bus emanating from microprocessor-controller 202 as represented at 214.

Analog-to-digital converter 208 develops about 12,000 updates or digitizing samples per second. Thus, for the four platforms involved, 3,000 such samples are achieved per second and, accordingly, the data submitted to the system can be processed essentially in real time. While the residence time of a truck wheel on a given platform will vary with speed, generally, with three samples being developed or digitized for a millisecond, over 60 samples will be achieved for a singular wheel crossing. The selection of sampling or update rates as are carried out by converter 208 is a subject of design choice based upon the knowledge developed from the instant apparatus and method. It is particularly desirable that the sampling rate be sufficient to effectively isolate peak amplitude information. Under conventional Nyquist sampling theory, the sampling rate should be at least twice the natural resonant frequency of the scale weighing platform.

The resultant digitized data are submitted by a six-line serial output as represented earlier at 72 and again identified by that numeration to a digital signal processing function represented, as before, at 70. This digital signal processor (DSP), operating in conjunction with high speed memory carries out digital filtering and logical operations required for an analysis of the submitted data. In particular, the analysis provides for the isolation or identification of digital or amplitude values which represent a correlative of the weight being evaluated. As indicated earlier herein, the DSP computing function 70 serves in conjunction with a P.C. level computer and this interaction is represented in FIG. 5 by the bus system of such a computer as represented at 218.

Figure 6:
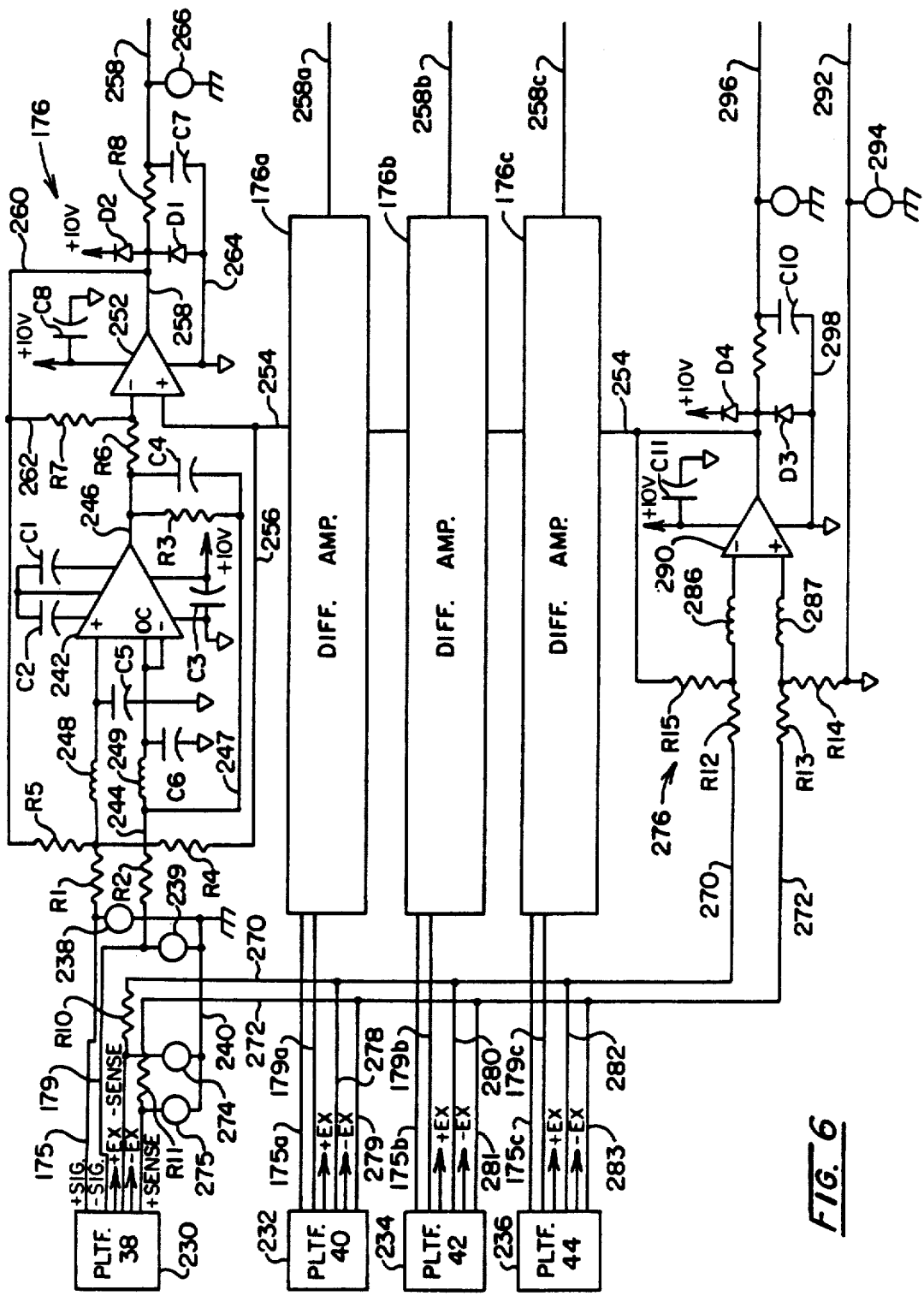
FIG. 6 is an electrical schematic diagram showing signal treatment features of the control components of the facility of FIG. 1 at an enhanced level of detail.

Referring to FIG. 6, components which may carry out the differential amplification form of signal treatment represented at symbol 176 in FIG. 5 are revealed. In this regard, inasmuch as the components for each channel associated with a given platform are identical, only that channel represented at 176 is shown in detail. The remaining channels are shown as blocks having the earlier described designations 176a–176c. Amplification function 176 receives the signal outputs (SIG) and excitation related sensing (SENSE), of the load cell array 150, here represented by block 230 and labelled "Platform 38". In similar fashion, block 232 identifies the combined load cell outputs from platform 40; block 234 represents the outputs from the load cells of platform 42; and block 236 represents the signal outputs and excitation sense monitoring from platform 44. Looking to block 230, it may be observed that the two signal outputs therefrom (SIG) are provided, as before, by lines 175 and 179. Because these lines may be of considerable length and in view of the environment in which they typically will be installed, discharge tube type lightning or spurious signal protectors are provided at 238 and 239 one side of each of which is coupled to ground at line 240. Line 175 is seen coupled through resistor R1 to the non-inverting input of an operational amplifier 242, while line 179 is shown extending to the opposite input of amplifier 242 via line 244 and resistor R2. Provided, for example, as a type 7652 operational amplifier, the output of amplifier stage 242 at line 246 is coupled via resistor R3 and feedback line 247 to line 244 at its inverting intput, such architecture exhibiting effectively a virtual ground to the signal outputs from platform 38 to block 230. Inductors 248 and 249 are provided within respective lines 175 and 244 to provide RFI protection. Amplifier 242 is configured as being chopper stabilized as represented by the presence of capacitors C1–C3 and its output line 246 is directed to the inverting input of an operational amplifier 252. The opposite input to amplifier stage 252 is derived from line 254 carrying a load cell common or excitation monitoring signal. This signal also is seen directed via line 256 and resistor R4 to line 175, while the output of the stage at line 258 is seen coupled via line 260 and resistor R5 to line 175. Amplifier 252 derives a negative gain which thus is fed to the positive input of stage 242 for purposes of providing an amount of negative feedback to the positive terminal of amplifier 242. This is in complement with the feedback asserted through resistor R3 to the negative terminal of the same amplifier. Line 258 further is seen coupled through diode D1 to ground line 264 incorporating capacitor C7. Additionally, line 258 is coupled to +10 v through diode D2. A discharge tube lightning protector 266 is seen coupled between the output line and ground. The resultant output extending through resistor R8 provides a 2-volt full scale signal representing the load response of platform 38.

As indicated earlier, the excitation inputs to the strain gauges of the load cells also are monitored. In this regard, monitoring lines 270 and 272 are seen coupled through respective resistors R10 and R11 to the positive and negative polarity excitation sense lines of block 230. As before, these lines are protected with respect to lightning or similar spurious signals by respective discharge tubes 274 and 275. Lines 270 and 272 are seen directed to an excitation monitoring network represented generally at 276. These lines, accordingly, are also coupled in common with the corresponding excitation terminals of the remaining three scale platforms 40, 42, and 44. Accordingly, the lines are coupled with those monitoring terminals through respective lines 278 and 279 emanating from block 232; through respective lines 280 and 281 emanating from block 234; and through respective lines 282 and 283 emanating from block 236. Thus commonly coupled, the lines 270 and 272 extend through respective resistors R12 and R13, as well as respective RFI blocking inductors 286 and 287 to the inverting and non-inverting inputs of operational amplifier 290. Line 272 at the entrance to amplifier 290 is shown coupled through resistor R14 and ground to line 292 to provide a reference (REF), line 292 being protected by discharge tube 294. The output of amplifier 290 at line 296 represents a load cell common signal (LCG) and is coupled through diode D3 to line 298 incorporating capacitors C10 and, in turn, coupled to ground. Line 296 additionally is coupled to +10 v through diode D4 and the LCG output is coupled in common to each of the negative gain amplification stages of networks 176 and 176a-176c. In this regard, note that line 254, coupled to output line 296, is asserted at the non-inverting input to amplifier stage 252 as well as via line 256 and resistor R4 to input line 175. A similar configuration is provided for each of the noted remaining three channels 176a-176c. Thus, an initial input of the ratiometric structuring of the circuitry is provided. The output of amplification function 176 as provided at line 258, as well as the corresponding outputs of amplification functions 176a-176c, as represented at lines 258a-258c, are then directed to the unity gain and filtering function of the signal treatment components. Looking to FIG. 7A, the latter function as represented earlier at block 190 is identified in general by the same numeration as are the remaining three channels as represented by blocks 190a-190c. The latter channels are structured identically as that shown at 190. In the latter regard, line 258 carrying the 2 volt full scale signal of the initial channel emanating from platform 38 is seen directed through resistor R15 to the inverting input of an operational amplifier 306. The opposite input to amplifier 306 is the load cell common (LCG) signal from line 296 as directed thereto through resistor R16. Thus, the output at line 308 of the stage 306 carries the ratiometric topology leading to the digital conversion at a later stage. Output line 308 is seen coupled via line 310 and resistor R17 to input line 258 and through line 312 and resistor R18 to line 296 at the input to stage 306. The VCC and VEE inputs to amplifier 306 are shown directed from analog ground line 314 and respective capacitors C13 and C14. This ground line 314 is utilized in the same manner in common with each of the unity gain and filtering functions of the remaining three channels 190a-190c, as well as the remaining stages of reference to driving excitation monitoring network 276 the remaining two stages of which are represented in the instant figure. Output line 308 as now referenced with respect to analog ground line 314 is next directed to a 125 Hz low pass filter stage represented in general at 316 and comprised of the network of operational amplifier 318, capacitors C15 and C16, and resistors R19 and R20. This two pole filter provides a filtered and referenced output at line 192 which is directed to one input of a multiplexer 208, as described with the same numeration in FIG. 5. In similar fashion, the outputs of unity gain and filtering functions 190a-190c are shown provided at respective lines 192a-192c which, in turn, are additionally directed to the inputs to multiplexer 200.

The ratiometric treatment of the reference signals from the load cells is further developed at differential gain stage and filter 324. In this regard, the figure shows reference line 292 addressing an operational amplifier 326 through resistor R21 while, correspondingly, the load cell common signal at line 296 addresses the non-inverting input of amplifier 326 via lines 328 and resistor R22. Device 326 further is coupled with power supply through capacitors C17 and C18 from analog ground line 314 and provides an output at line 330 which is coupled to feedback line 332 incorporating resistor R24 which extends to the inverting input at line 292. In similar fashion, line 334 incorporating resistor R23 extends to the non-inverting input to device 326 at line 328. Line 330 is shown directed to the input of a 1 Hz filter represented generally at 338 and comprised of operational amplifier 340 performing in conjunction with a network including capacitors C19, C20 and resistors R25 and R26. The thus-filtered reference signal is developed at reference line 342. Capacitors C21 and C22 are seen coupled between lines 342 and appropriate leads at analog ground line 314 for stability purposes. Line 342 is seen to be directed to the VREF terminal input of an analog-to-digital converter (A/D) again represented by number 208 (FIG. 7B).

Looking additionally to FIG. 7B, converter 208 may be provided, for example, as a type C55016 marketed by Crystal Semiconductor, Inc. This device exhibits the high conversion rate characteristic discussed in conjunction with FIG. 5. Device 208 is provided a clock input from a 4 MHz oscillator 350 (FIG. 7A) the output of which at line 352 extends to the clock input of device 208. Similarly, the inputs from analog ground line 314 are seen coupled with converter 208 via lines 354, 356, and 358. A power supply providing positive and negative polarity components is represented in FIG. 7B at block 360. This supply, inter alia, provides a digital ground input (DGND) to converter 208 via line 362.

Output signals selected by multiplexer 208 are presented at line 364 to a unity gain buffer represented generally at 366 in FIG. 7A. Incorporating a type LF 356 operational amplifier 368 and powered from multi component line 358 via lines 370 and 372, the buffer 366 is configured having a feedback loop at line 374 and the non-inverting input thereof receives a signal from component 358 via line 376 incorporating resistor R31. The output of stage 366 at line 378 extends to the analog input (AIN) of converter 208.

Multiplexer 200, as well as converter 350 and associated serial data output lines of the control system are under the control of a microprocessor earlier described at 202 and having the same identifying numeration.

Device 202 may be provided, for example, as a type 80C31 marketed by Intel Corporation. Microprocessor 202 incorporates a 128 byte internal RAM function which is considered sufficient for the task of controlling conversion at device 208 as well as or transmission and reception of necessary data for the system at hand. The 16 address ports A00–A15 of the device are shown at lead array 380 along with ports P10–P17 intended for the control of the operation of converter 208, as well as managing the transmission and reception of data with respect to the digital signal processing function (DSP) earlier described in connection with sub-block 70 in FIG. 1 and identified by the same numeration herein. Additional interactive controls for device 202 are coupled with lead array 384 directed, in turn, to bus branch 386. A 12 MHz oscillator network is provided for device 202 by the crystal based oscillator network represented at 388 and a reset network for start-up purposes and the like is provided at 390 having an output at line 392 directed to the RST terminal of microprocessor 202. Bus branch 382 also extends through lead array 394 to the input of an 8-bit address latch 396, the output of which at lead array 398 extends, in turn, to the A0–A7 address inputs of an EPROM memory 400. Latch 396 may be provided, for example, as a type 74HC373 and functions to form the low 8-bits of a 16-bit address employed for addressing the memory 400. The latter device may be provided, as a type 27C256 marketed by Intel Corporation and is structured having a 32K × 8 architecture. The D0–D7 terminals of memory 400 are shown coupled via lead array 402 to bus branch 404 extending, in turn, to branch 382. Additionally, a bus branch 406 extends to the A8–A13 terminals of memory 400 via lead array 408, while the output enable and A14 terminals are coupled via dual lead array 410 to bus branch 404.

Bus branch 382 also is seen directed to data terminals D0–D7 of converter 208 as represented at lead array 412, while certain of the control inputs to device 208 are derived as labeled at lead array 414 extending from bus branch 382. Selection control over multiplexer 200 (FIG. 7A) is asserted from bus branch 404 through two lead array 416 seen extending to the A and B terminals thereof.

A logic interface for carrying out serial communication with the digital signal processing function represented at block 72 and communicating arrow 72 is represented within a dashed boundary 418. The components represented therein are of conventional serial input-output structuring and the network 418 functions under the control of microprocessor 202, inter alia, through a four-bit latch 420 which may be provided, for example, as a type 74HC175. The data input and write terminals of device 420 are controlled from bus branch 382 via line array 422 and the controlling outputs thereof are represented at line array 424. Data are serially transmitted by the arrangement, in particular, along line 426 which may be operated in a bi-directional manner. Additionally, the data are synchronized and a corresponding synchronizing clock output is provided to the network 418 via line 428. A serial output of data also is provided via line 430.

Additional data representing vehicle presence, vehicle speed and configuration as generated from facility 10 are represented in FIG. 7B as being developed and undergoing appropriate signal treatment at a block 436. The resultant signal outputs from this signal treatment function are represented at arrow 438 as being directed to a vehicle detection input network represented at block 440. Communication from network 440 with the microprocessor 202 is represented at bus branch 442.

As indicated herein, the data as developed by the very rapid sampling function carried out by converter 208 are treated at very high speed by the digital signal processing function 70 which operates in conjunction with a high speed memory represented at block 444. Communication with memory 444 and a general purpose computer represented at block 446 is represented by the bus symbol 448. As indicated herein, the entire output as controlled by computer 446 may be transmitted by a communication approach incorporating a modem function discussed earlier at block 76.

Figure 8:
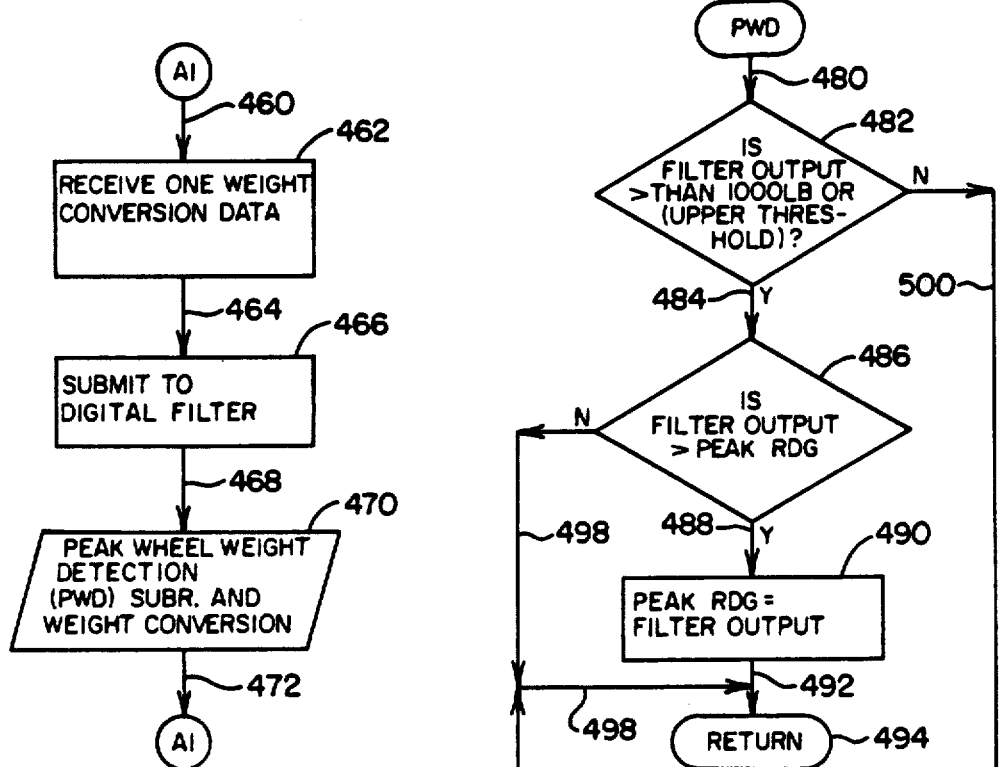
FIG. 8 is a flow diagram of certain aspects of a general program by which the digital signal processing function of the control system of the invention performs.

Referring to FIG. 8, a generalized and restricted flow diagram of the general operation of DSP function 70 is revealed. In this flow chart, those components of the program which are associated, for example, with the calculation of axle spacing, vehicle speeds, and the like are not considered. The program is seen entered at node A1 and line 460 whereupon it progresses to receive the conversion data from the analog-to-digital converter 208. This receipt is essentially instantaneous, being acquired in about 20 microseconds. A resultant datum then is submitted, as represented at line 464 and block 466 to digital filtering. Such filtering is carried out by the DSP 70 and is, considered from an analog fashion, equivalent to a 90 Hz 8-pole filter. This selection of filter level follows from the analysis of data and functions to diminish or restrict signals representing a ringing in the scale platform at its natural frequency or the frequency at which it will oscillate if impulsed. Following such filtering, then, as represented at line 468 and block 470, the program calls a peak wheel weight detection subroutine and this routine performs in conjunction with a calibration based weight conversion. The program then returns to node A1 and line 460 as represented at line 472.

Wheel weight from the amplitude type samples or conversions is relatively simply derived and includes a preliminary calibration procedure. This procedure involves the reading of the output signals of the instrumentation when a given platform is empty and deriving an offset value which is stored. A known weight, for example 1,000 lbs, is then applied to the platform. While a variety of procedures can be provided for asserting this calibrating weight, an approach found acceptable has been that of placing a static load on the scale platform. With the calibrating weight on the scale platform, a new reading from the instrumentation is obtained and the offset earlier derived is subtracted therefrom. A span coefficient then is derived which represents a division of the value of the calibrating weight by the value now read, the offset value having been subtracted as noted above. This resultant span coefficient is then stored. For succeeding dynamic weighments, the DSP subtracts the offset value and multiplies the result by the span coefficient to receive a reading in selected units such as pounds or metric units.

Figure 9:
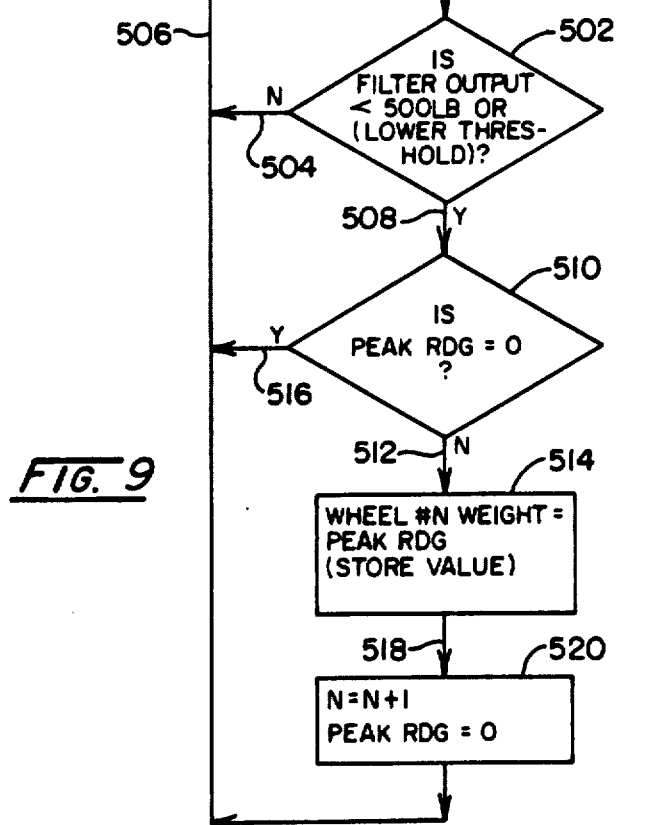
FIG. 9 is a flow chart of a routine called in conjunction with the program of FIG. 8.

Referring to FIG. 9, the peak wheel weight detection routine is revealed in block diagrammatic fashion. This routine, in effect, detects a wheel at a scale platform and further determines that it is acquiring or has acquired a peak weight. While a direct correlary has been found between the peak weight valuation following analysis of experimental data, other effective weight equivalent valuations from the instant weighing procedure potentially may be found. Such peak evaluation as well as other weight equivalent evaluations which may be found effective are developed through the high sampling or conversion rates of the system at hand. In effect, the conversion rate is selected of high enough value so as to acquire a discernable value which has a correlary to the weight of the vehicle passing over the scale platform at hand.

The instant routine is seen to commence with line 480 leading to the inquiry presented at block 482 wherein a determination, in effect, is made as to whether a wheel is on the scale and this is done by setting a predetermined threshold weight value representing such an occurrence, for example, 1,000 lbs. This selection of an upper threshold will be seen to be made also in conjunction with development of a lower threshold of value spaced from or lower than the upper threshold for determining whether a wheel is leaving or has left. A form of hysteresis in the evaluation thus is seen to be imposed to avoid an undue oscillatory form of determination of whether a wheel is on or off the platform. Accordingly, where the weight evaluated is greater than the upper threshold or, for example, 1,000 lbs., the program proceeds as represented at line 484 and block 486 where an inquiry is made as to whether the output of the digital filter, as described in conjunction with block 466 in FIG. 8, is greater than any predetermined peak reading for the instant scale platform evaluation.

Where the inquiry at block 486 results in an affirmative determination, then as represented at line 488 and block 490, the peak reading for the instant evaluation is made equal to that evaluated filter output. Then, as represented at line 492 and node 494, the routine returns and, in effect, a determination then is made as to whether any next succeeding reading is greater than this peak value whereupon an update is made. On the other hand, if indeed the peak reading has been reached, then the subsequent data will develop a wheel leaving platform determination. Accordingly, returning to the inquiry at block 446, where a determination is made that the filter output is not greater than the peak reading but is greater than the upper threshold or 1,000 lbs., then as represented at lines 496 and 498, the routine returns.

Where the determination at block 482 is that the evaluation representing the filter output is not greater than the upper threshold or, for example 1,000 lbs., then as represented at line 500, the program looks to the inquiry at block 502 wherein a determination is made as to whether the filter output or instant weight evaluation is greater than the lower threshold, for example, 500 lbs. Where the value falls below that lower threshold, then as represented at lines 504, 506, 498, and 492, the routine returns as represented at node 494, a procedure wherein a nomination or trial determination is made that a wheel is leaving the scale platform at hand.

Where the determination at block 502 is that the output is less than the lower threshold, then as represented by line 508, the program looks to the inquiry at block 510. This inquiry determines whether or not the peak reading is zero. In the event that it is not, then a condition is at hand wherein the reading is below the lower threshold and, as represented at line 512 and block 514, the weight of the wheel on the instant platform, herein designated wheel "N", is the peak reading and that value is stored. On the other hand, if an affirmative response is made to the inquiry at block 510, then as represented by lines 514, 506, 498, and 492, the routine returns, a condition wherein no wheel has reached the scale platform being determined.

Following the storage of peak reading as weight as represented at block 516, the routine progresses as represented at line 518 and the wheel designation is now changed from N to N+1, and the peak reading for that next wheel, should it arrive, is set to zero. The routine then returns as represented at lines 506, 498, and 492.

Figure 10:
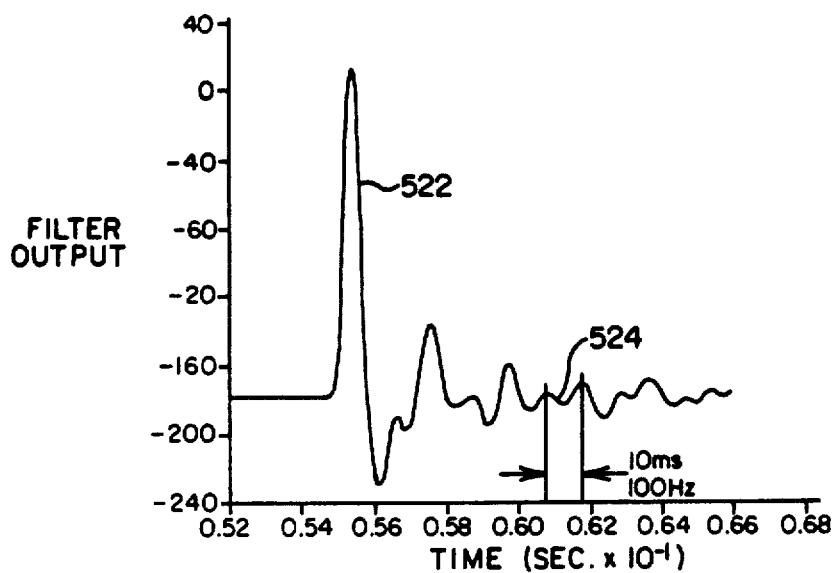
FIG. 10 is a graph showing an impulse testing of an unloaded scale platform employed with the invention.

As a preliminary evaluation of the scale facility 10 prior to the evolution of the discovery described herein, a scale platform was tested with a series of impulse procedures both without the imposition of a static load and with the positioning of a gradually increasing sequence of static weights on the scale. FIG. 10 shows an evaluation of the natural or resonant frequency of the scale platform in an unloaded state. These tests were undertaken in a factory environment as opposed to the roadway facility. Analog signal treatment of the scale platform output was carried out in the manner described above and analog-to-digital conversion was provided at a 2000 Hz sampling rate. Data were collected at a DSP function as at 70 but no digital filtering took place at that stage. Collected data were then transferred to an off-site computer for analysis including generation of the curves represented in FIGS. 10-15. Referring to FIG. 10, the impact of a sledgehammer upon the scale platform is represented at curve portion 522, while the natural or resonant frequency of the scale platform under test is shown at curve 524 to be about 100 Hz at a 10 ms interval. It was to be expected that with the addition of mass or weight to the platform the resonant or natural frequency of the assemblage thus loaded would lower in accordance with the above discussed relationship between natural frequency and mass.

Figure 11:
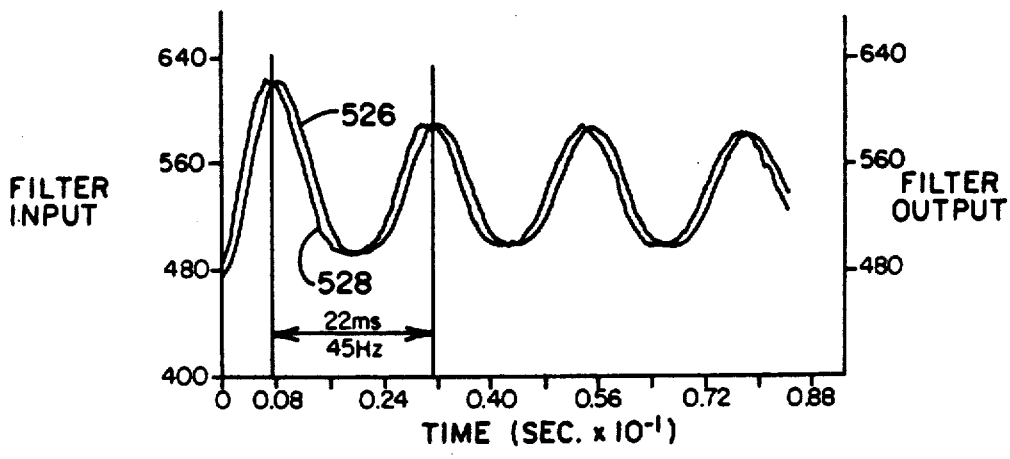
FIG. 11 is a graph showing curves representing the impulse responsive resonant output of a scale platform employed with the invention with a 1,000 lbs. load thereon.

Referring to FIG. 11, the frequency response of the scale platform under impulse test with the imposition of a 1,000 lbs. dead load or static load is revealed. The graph shows a curve 528 representing the input to the 100 Hz digital filter and a curve 526 representing the output of that filtering function. The curve shows that within a 22 millisecond interval, a 45 Hz frequency is developed and such information is in keeping with the expected relationship of mass and frequency with respect to the above test.

Figure 12:
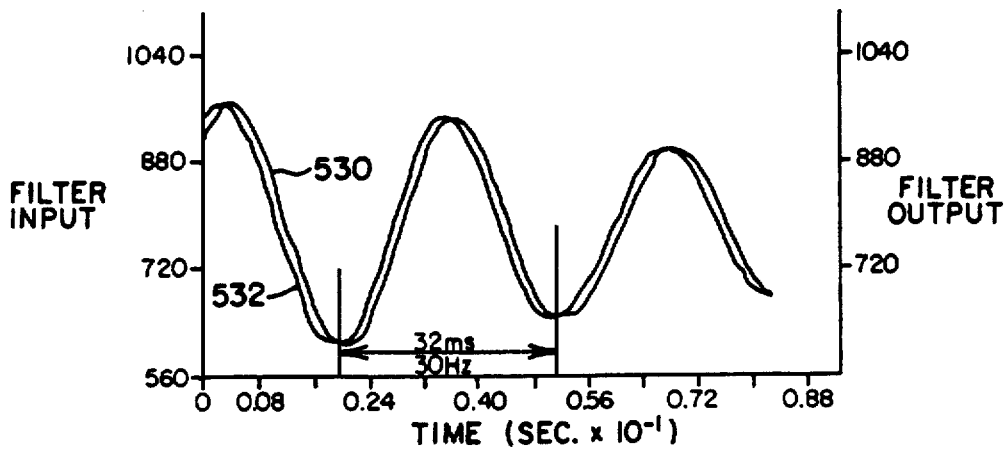
FIG. 12 is a graph showing curves representing the impulse responsive resonant output of a scale platform employed with the invention carrying a 4,000 lbs. load.

Looking to FIG. 12, filter input curve 532 and filter output curve 530 show the resonating components of a plotted curve under conditions wherein a 4,000 lbs. static load was applied to a scale platform and a sledgehammer was used to induce an impulse into it. The curves 530 and 532 show, as expected, a 30 Hz resonant frequency representing a diminution in the natural frequency value.

Figure 13:
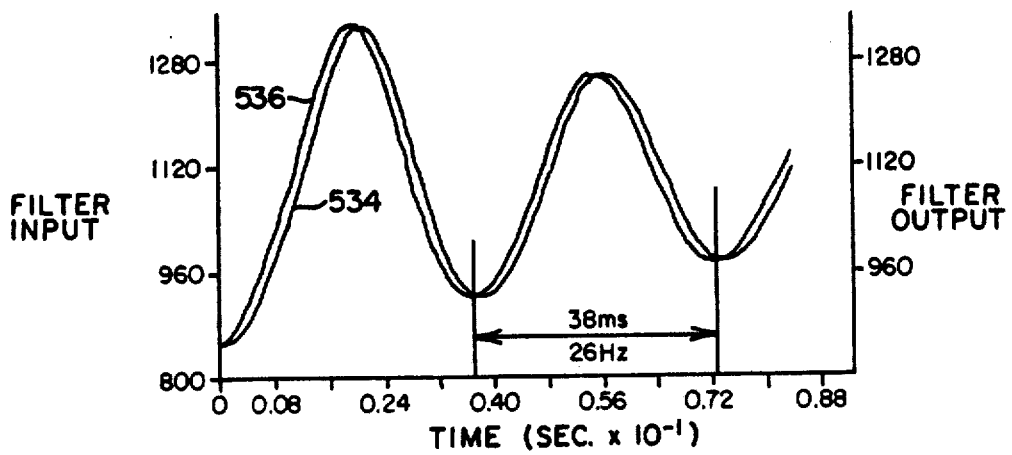
FIG. 13 is a graph showing curves representing the impulse responsive resonant output of a scale platform employed with the invention with the imposition thereon of an 8,000 lbs. load.

Looking to FIG. 13, filter input curve 536 and filter output curve 534 represent the results of a similar impulse test undertaken utilizing an 8,000 lbs. static or dead load upon a scale platform with application of an impulse using a conventional sledgehammer. These curves show that the natural frequency of the platform with such static load applied diminished, as expected, to a level of 26 Hz.

Figure 14:
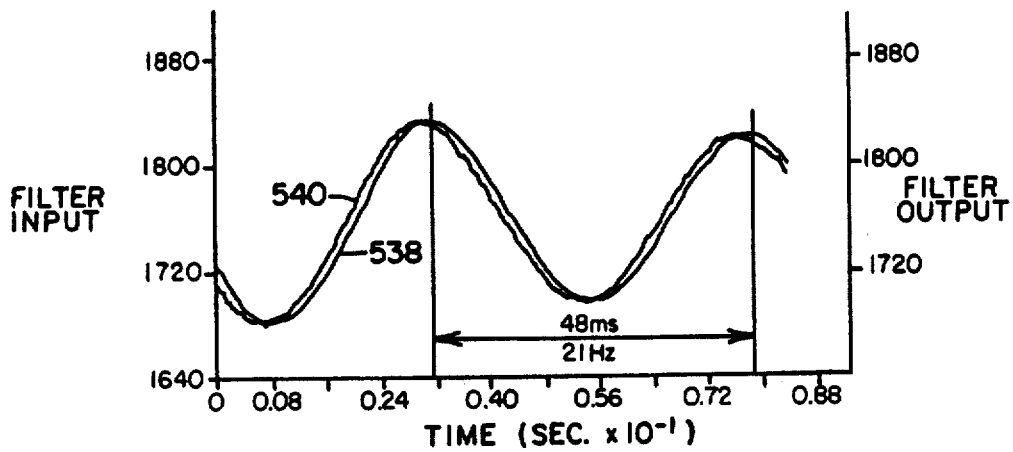
FIG. 14 is a graph showing curves representing the impulse responsive resonant output of a scale platform employed with the invention with the imposition thereon of a 16,000 lbs. load.

Referring to FIG. 14, curves 540 and 538 represent plots for the above described filter input and full filter output signals or values for an impulse test carried out with a 12,000 lbs. static or dead load on the tested scale platform. Impulsing was applied, as before, utilizing a conventional sledgehammer and, as expected under conventional theory, the natural frequency of the combined scale and static weight diminish to about 21 Hz.

Figure 15:
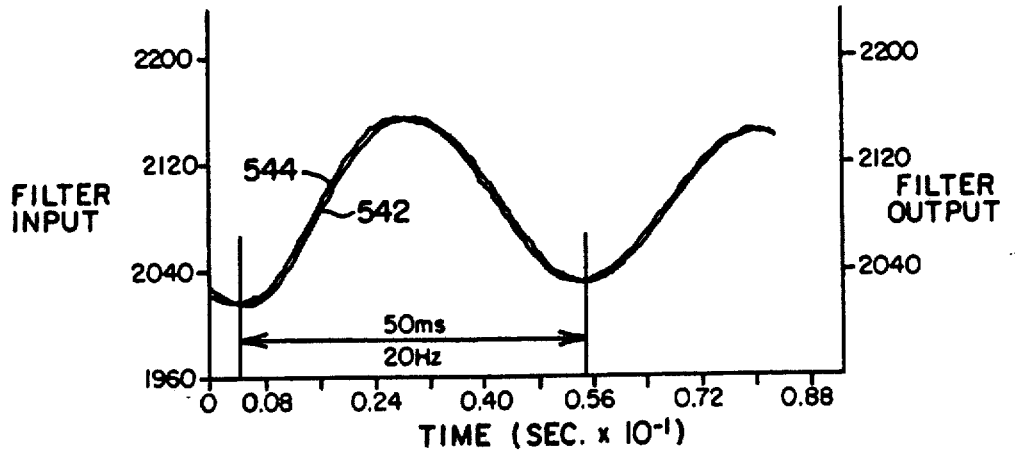
FIG. 15 is a graph showing curves representing the impulse derived frequency output of a scale platform according to the invention with the imposition thereon of a 20,000 lbs. load.

Looking to FIG. 15, filter input curve 544 and filter output curve 542 show the result of impulse testing using the procedure as above described but in connection with the assertion of 20,000 lbs. static or dead load upon the scale platform under test. The curves reveal that, as expected, the coupling of an even larger mass results in a corresponding dimunition in frequency, here represented as about 20 Hz.

As the conclusion of the above tests utilizing applied static loads to a scale platform within a factory environment and in view of the data represented by FIGS. 10 through 15, it was opined by the investigators that considerable difficulties would be encountered in attempting to evaluate the data received during field tests subsequent to achieve an accurate weighing (WIM) of a truck moving across the platform. In particular, it was the opinion of the investigators that some form of in motion calibration would be required calling for elaborate correlation theory based software.

Figure 16A:
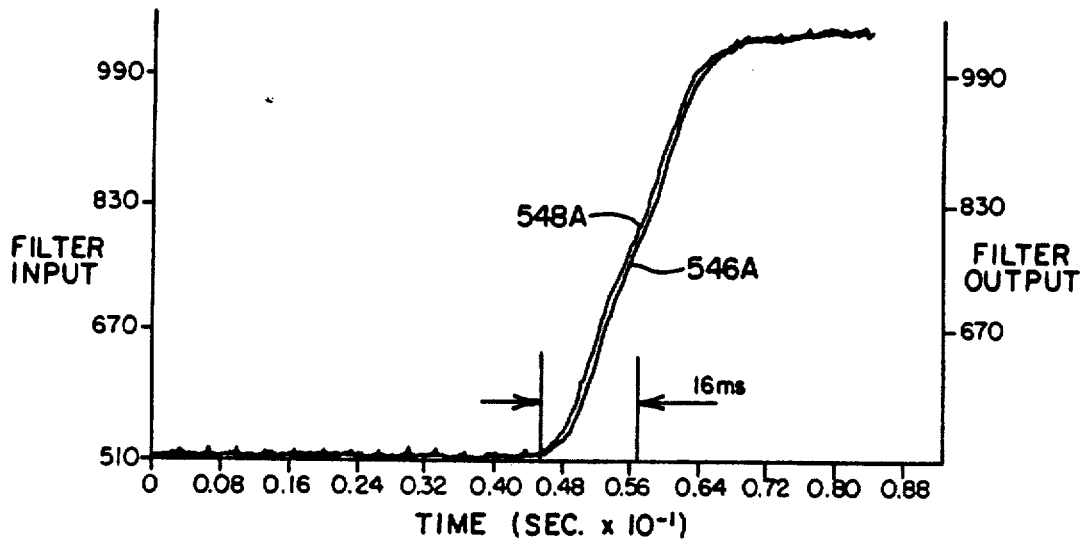
FIGS. 16A and 16B combine to display curves showing the output of the control system of the invention in response to one wheel of a test truck passing over a scale platform.
Figure 16B:
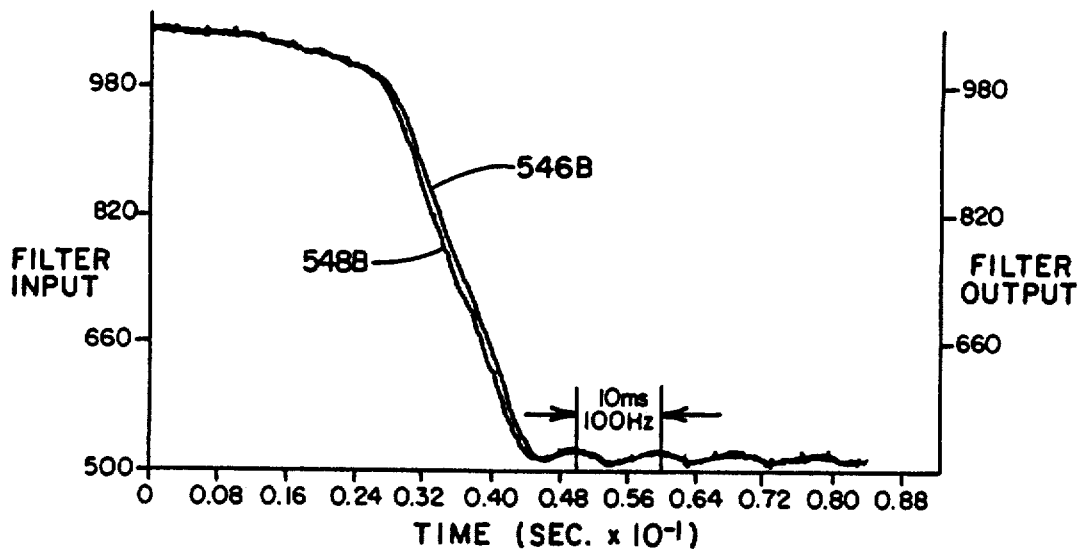

Following the above static load tests on the scale platform, the tests progressed to the actual test site 10. To carry out dynamic or vehicle in motion tests, a test truck was employed which was owned by Wayac Company of Ohio The test truck was configured in general having a forward axle carrying two steering wheels and a tandem pair of rearwardly disposed axles. Spacing between the steering axle and the first tandem axle was 174 inches and between the tandem axles was 52 inches. This test truck carried a test weight of 20,000 lbs. To provide preliminary weight data each of the wheels of the truck were positioned upon the facility 10 scale platforms under parked or static conditions for multiple preliminary static readings. For the above preliminary weight data and subsequent weigh-in-motion tests as noted above, no digital filtering was carried out at DSP function 70. Following analog filtering at 125 Hz filter stages 190, the output signals were converted to digital form at converter 208 and collected by DSP 70. Such data were then collected in computer 446 random access memory (RAM) for 3.8 second intervals and then written to the computer discs. Data carried by these discs were then loaded into an off-site VAX computer (marketed by Digital Equipment Corp.) for analysis including off-site digital filtering, inter alia, at 90 Hz and generation of the curves shown in the figures to follow. At the off-site computer, recognition of the peak amplitude aspect of the invention and corresponding development of the processing procedures represented at FIGS. 8 and 9 occurred. The test truck was driven over the facility 10 at a variety of speeds. Data representing the output of the weighing system for movement of the truck over a platform at 27 mph is represented in FIGS. 16A and 16B for one wheel at the noted steering axle. The conversion rate for A/D converter 208 at the site 10 location was increased to 3,000 conversions per second. The weight responding output of the system for digital signals to the input of the off-site digital filter are represented in FIGS. 16A and 16B respectively at curves 548A and 548B. Correspondingly, the digital response for the output of the off-site digital filter is represented in FIGS. 16A and 16B, respectively at curves 546A and 546B. The response of the scale as the truck steering axle wheel entered the scale platform is represented in FIG. 16A as a rise time of about 16 ms. This represents a highly responsive reaction of the scale platform to the presence of the wheel, a condition not to be expected in view of the earlier static mass test. FIG. 16B shows a continuation of the curve of FIG. 16A and, in addition to showing a very fast curve fall time as the truck wheel left the scale platform, also shows at region 550 for each of these curves a resonancy in the scale platform at about 100 Hz, a value representing its unloaded natural frequency. The curves show an entirely unexpected result indicating significant scale response. It is opined that the mass represented by the test truck, in effect, was decoupled from the scale platform during the motion of the wheel thereacross. The rational for this reaction is generally unexplained, however it may be observed that the pneumatic tires of the truck, as well as any associated suspension may, under moving or dynamic conditions, achieve this decoupling effect to substantially retain the natural resonant characteristics of the scale without an influence of the weight itself of the truck. The scale platform had transferred substantially all dynamic force imposed by the vehicle through its wheel without a mass coupling to the scale. Note that the curves 546 and 548 appear to show a somewhat rounded peak as opposed to a flattened peak as otherwise might be expected.

Figure 17A:
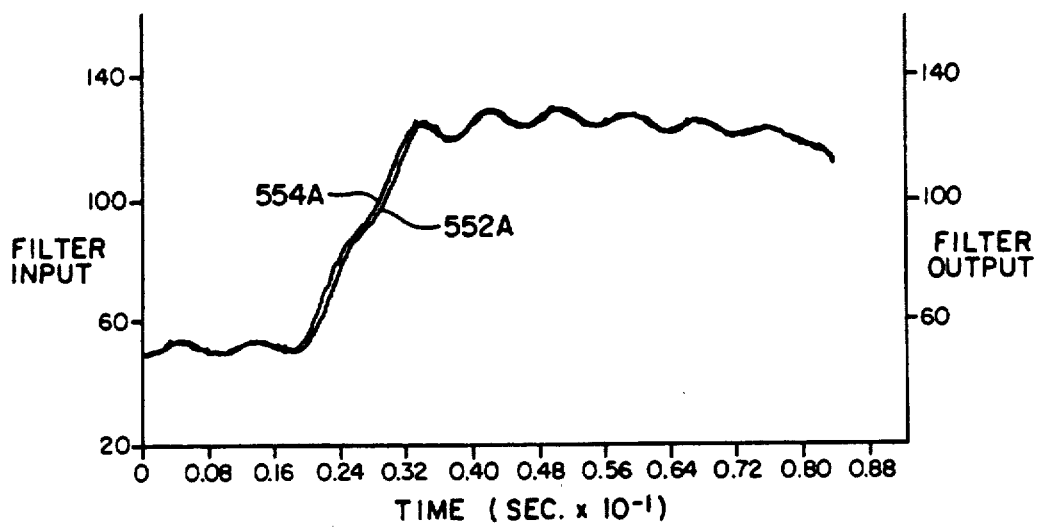
FIGS. 17A and 17B combine to show output curves representing the response of the weighing apparatus of the invention to the passage over a platform scale thereof of another wheel of a test truck.
Figure 17B:
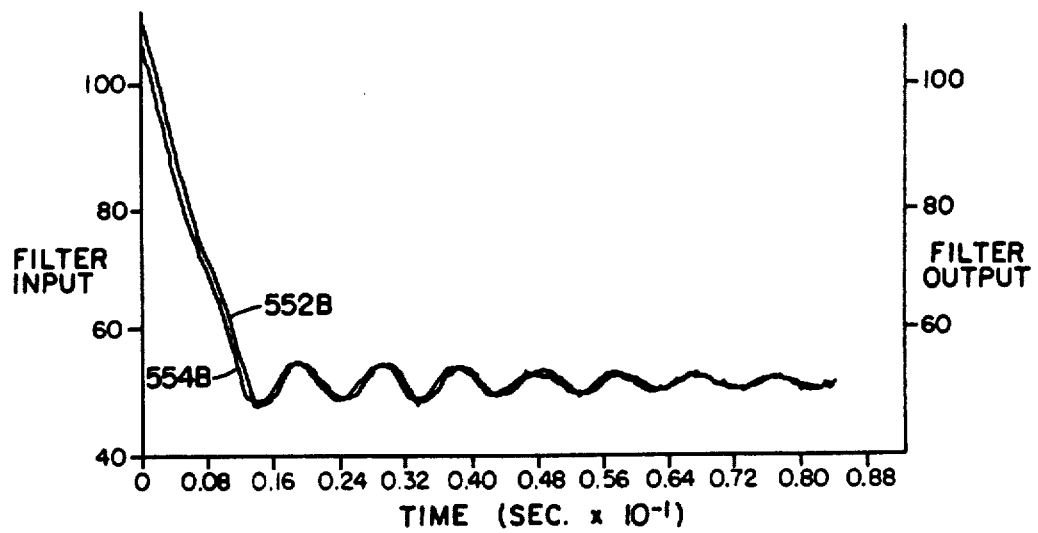

Referring to FIGS. 17A-17B, curves 554A-554B representing the input to the noted off-site digital filter and curve 552A-552B representing the output from that digital filter at a 90 Hz low pass digital filter frequency are revealed for the same truck as described in connection with FIGS. 16A-16B, however, the data being taken with respect to the last wheel or the second of the tandem wheels to encounter the scale platform. The curve, as before, shows in FIG. 17A a very fast or rapid rise time response of the platform to wheel entry followed by an undulating curve cap during the interval of wheel residency on the platform. FIG. 17B shows a corresponding sharp curve drop or short curve fall time followed by an undulating curve region more than likely representing natural scale frequency. For the test represented in FIGS. 16A-16B and 17A-17B, and others, an examination of the resultant data led to the earlier-described correlation between peak values of the curve and actual truck weight.

Figure 18:
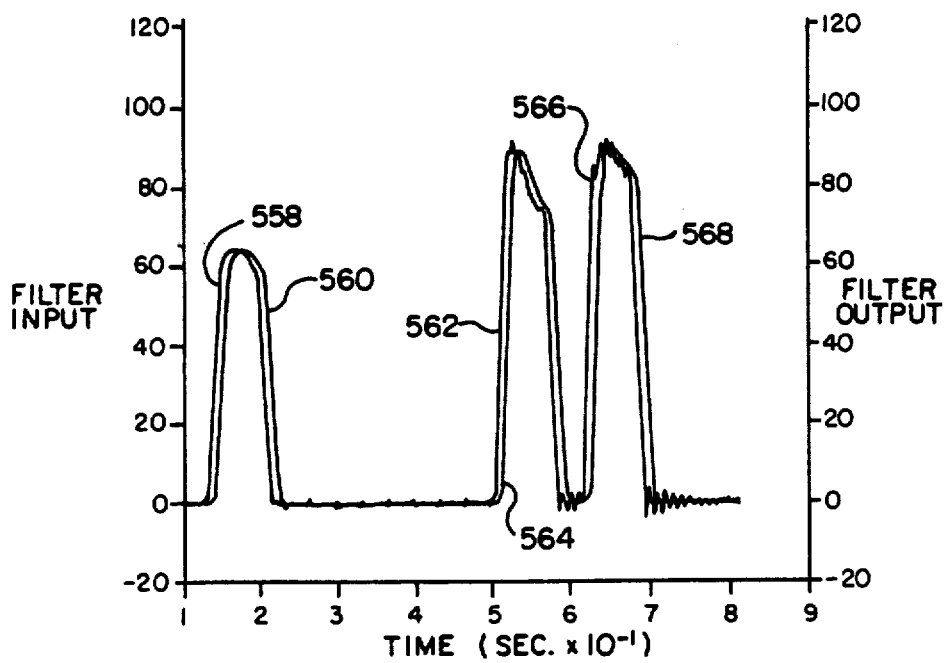
FIG. 18 is a graph showing output curves representing the passage of three wheels of a test truck over a scale platform of the apparatus of the invention.

The earlier-described test truck was driven over the facility 10 and the output of one scale platform is represented in FIG. 18. The weight carried by the truck was 20,000 lbs. A wheel at the steering axle provided a sharply demarcated off-site filter input curve 558 and output curve 560 as represented in the figure. Shortly thereafter, the initial one of the tandem rear wheels encountered the platform and the output thereof is sharply demarcated for off-site filter input at curve portion 562 and for off-site filter output at curve 564. The closely associated last tandem axle positioned wheel provided off-site digital filter input signals as represented at curve 566 and off-site filter output signals as represented at curve 568.

Figure 19:
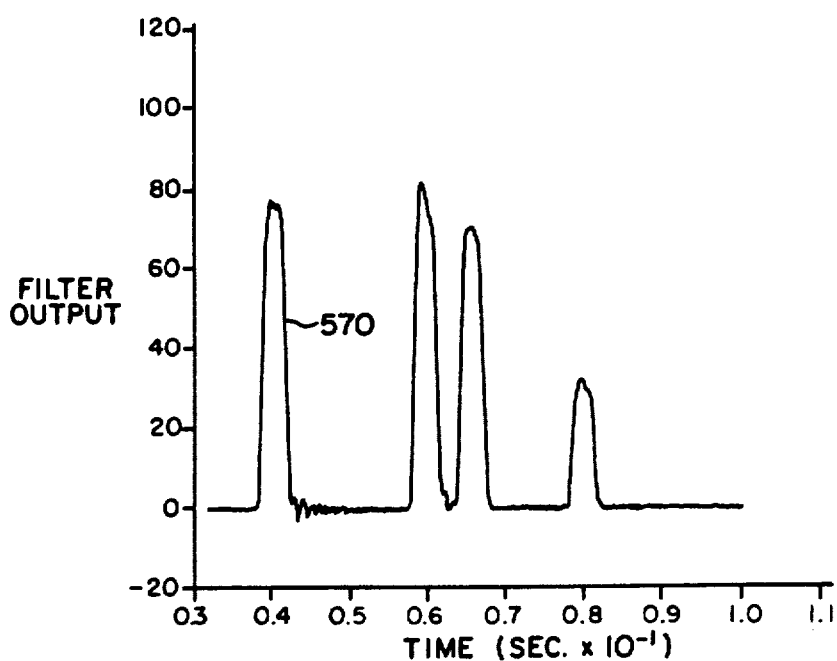
FIG. 19 is a graph showing an output curve derived from the apparatus of the invention as a scale platform thereof responds to the passage of a cement truck thereover.
Figure 20:
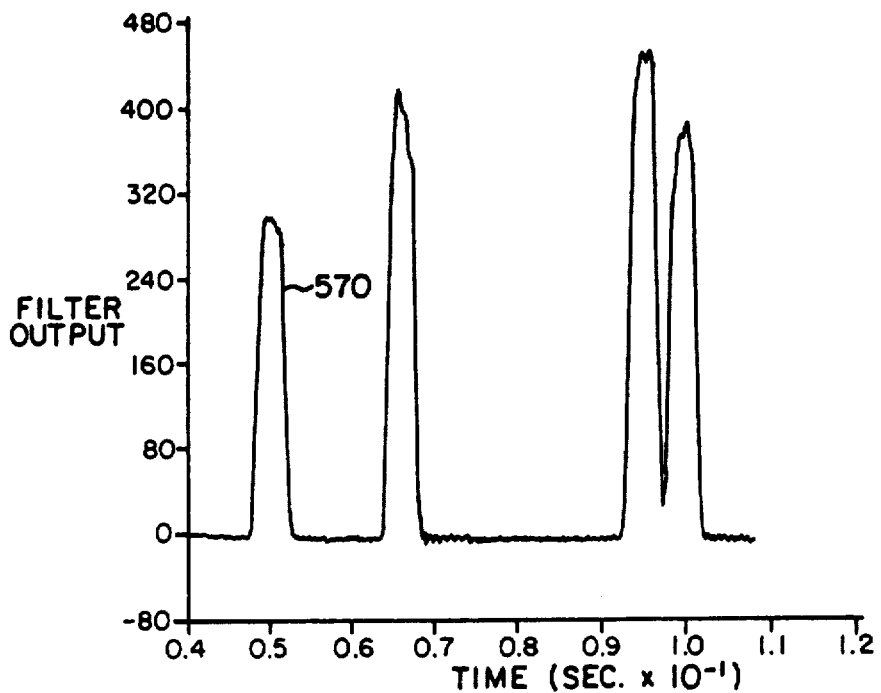
FIG. 20 is a graph showing the output of the apparatus of the invention as a scale platform thereof responds to the passage thereover of a tractor and construction trailer carrying a backhoe.

The high degree of response of the facility 10 to trucks of varying configuration, speed, and use is represented by the figures to follow. These curves were generated, as before, by an off-site VAX computer carrying out the noted digital low pass filtering. In FIG. 19, curve 570 represents the output of one scale platform as it responds to a four axled cement truck traveling over the facility 10 at a speed of 61 mph. A clear demarcation of the axles and an identification of peak amplitude is evident from the figure. FIG. 20 shows the output of one scale platform as a curve 572 accurately demarcating the four axles of a tractor and construction trailer carrying a backhoe and passing over the platform at speed of 52 mph.

Figure 21:
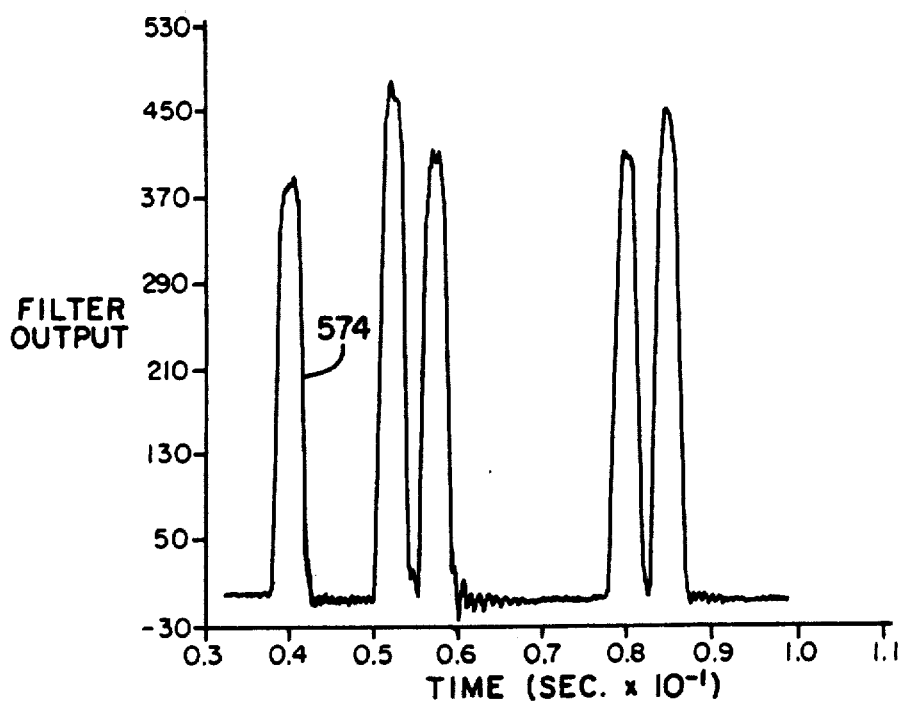
FIG. 21 is a graph showing the output response of one scale platform of the apparatus of the invention as it responds to the passage thereover of an 18 wheeled tractor-trailer vehicle.

FIG. 21 shows a curve 574 corresponding with the output of one scale platform of the facility 10 responding to the passage thereover of a tractor-trailer type truck of the 18 wheel variety moving at a speed of 57 mph. The five axles of this vehicle are readily discerned and the peak amplitudes of response are readily perceived.

Figure 22:
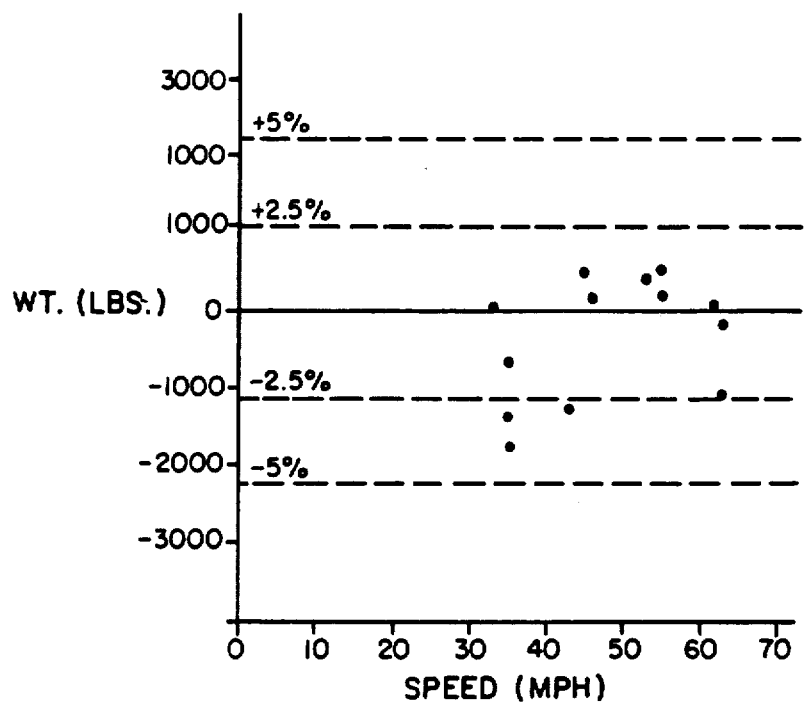
FIG. 22 is a chart plotting deviation of the response of the apparatus of the invention to the passage thereover of a test truck which is empty, the information being based upon gross weight analysis.

Further evaluations of the facility 10 followed from the initial efforts and discoveries. In particular, two test trucks were procured belonging to the Masstron Division of Toledo Scale Corporation. These trucks were structured as a conventional five-axled, 18-wheeled semi tractor-trailer trucks having a steering axle and two tandem axle pairs, one at the rear of the tractor and one at the rear of the attached trailer. One truck, maintained in an unloaded state during testing had axle spacings of 19'5" from the steering axle to the first tractor tandem axle; 4'4" between the tractor tandem axles; 4'1" between the trailer tandem axles. A second truck, maintained in a loaded state during testing, had axle spacings of 19'7" from the steering axle to the first tractor tandem axle; 4'4" between the tractor tandem axles; 37'5" from the second tractor tandem axle to the first trailer tandem axle; and 4'11" between the trailer tandem axles. In accordance with certain ASTM requirements, a static weighing of the trucks was carried out using wheel weighers obtained from the Ohio State Highway Patrol. Ten such weighers were utilized to weigh the test trucks on the noted unloaded and loaded bases. The results were checked against the weights of the trucks utilizing a conventional 60 foot long truck scale Each of the two test trucks utilized in the tests were driven over the scale system 10 three times each at speeds of 35, 45, 55, and 65 mph. Weight data were collected as above described and analyzed at the off-site computer. Deviations were calculated between the determined weights while in motion (WIM) and the static weightings earlier developed. The results were determined to be acceptable based upon currently envisioned standards. Referring to FIG. 22, the results of the WIM measurements of facility 10 versus the static weights so determined are plotted in terms of weight deviating from static weighing. The data of FIG. 22 are representative of gross weight measurement for the unloaded truck weighing 44,513 lbs under static weighing conditions. The results show essentially no influence or bias as a result of variations in speed of the vehicle over the scale facility. The results are well within what are currently considered to be acceptable tolerances.

Figure 23:
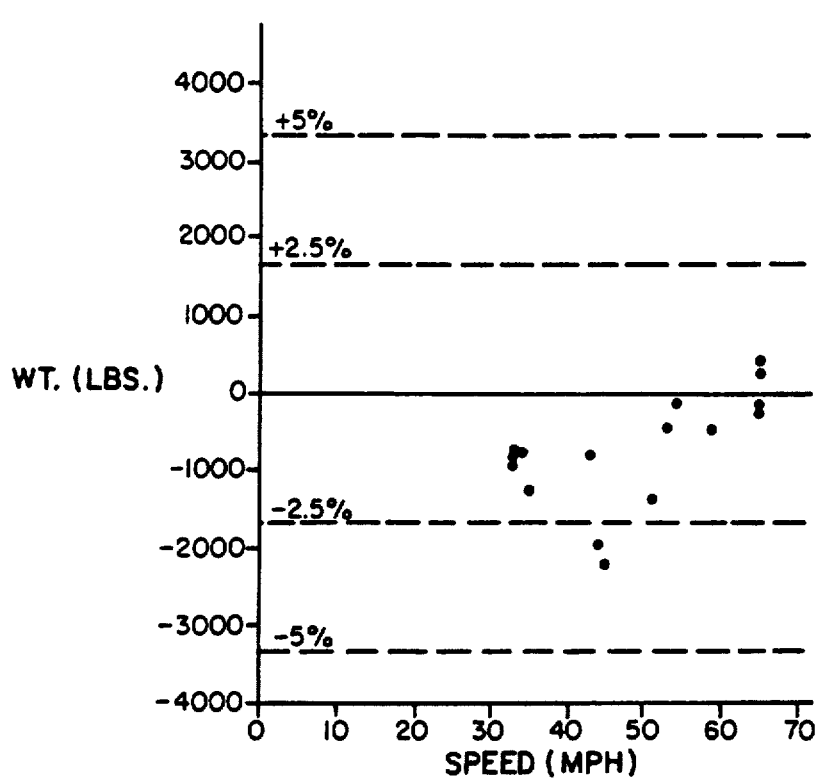
FIG. 23 is a chart plotting deviation of the response of the apparatus of the invention to the passage thereover of a loaded test truck which is empty, the information being based upon gross weight analysis.

Referring to FIG. 23, the results of a same form of feed testing with respect to the second test truck having a gross loaded weight of 67,230 lbs are revealed. As before, the results from this gross weight evaluation during WIM measurements using facility 10 show no discernable bias or influence of truck speed with weight results and that the weight results are well within currently envisioned tolerances requisite to such weighing procedures. Off-site computer aided analysis of test data showed that the scale platforms, preferably, should exhibit a natural resonant frequency greater than about 70 Hz. Such resonant frequency value selections serve to achieve adequate responsiveness of the apparatus at higher vehicle speeds, for example 65 mph.

Since certain changes may be made in the above-described apparatus and method without departing from the scope of the invention herein involved, it is intended that all matter contained in the description thereof or shown in the accompanying drawings shall be interpreted as illustrative and not in a limiting sense.

We claim:

1. A method for determining the weight of a vehicle while in motion along a given path, such vehicle being movably supported by wheels in contact with a surface, comprising the steps of:

providing a scale having a weighing platform at said surface exhibiting a select minimum natural resonant frequency and positioned to receive a said wheel in weighing relationship during said vehicle motion;

providing instrumentation operatively associated with said scale having output signals of amplitude variable in response to the imposition of force upon said weighing platform;

calibrating said scale by statically applying known weight to said weighing platform and correlating corresponding said output signals thereto to derive a calibrating datum;

acquiring said output signals in response to the movement of a said vehicle wheel over said weighing platform;

determining a weight equivalent value as a predetermined characteristic of said acquired output signals which is substantially independent of the velocity of said vehicle over said scale;

deriving the said weight of said vehicle by correlating said weight equivalent value with said calibrating datum; and outputting said weight value to a readout.

2. The method of claim 1 in which a substantially peak amplitude value of said output signals is derived as said weight equivalent value.

3. The method of claim 1 in which said scale weighing platform is selected having a said natural resonant frequency greater than about 70 Hz.

4. The method of claim 1 in which said instrumentation is provided having a digital converter stage deriving said output signals as digital signals at a sampling rate effective to identify said weight equivalent value.

5. The method of claim 4 in which said sampling rate is at least twice said natural resonant frequency.

6. The method of claim 1 in which said instrumentation is provided having a filter stage removing frequencies of said output signals above about 90% of said natural resonant frequency.

7. Apparatus for determining the weight of a vehicle moving along a given path, such vehicle being movably supported by wheels in contact with a surface, comprising:

a scale having a weighing platform locatable at said surface and along said path in an orientation for receiving a said wheel in weighing relationship, said platform being configured to exhibit a minimum natural frequency effective to transmit substantially all dynamic force imposed thereon by said vehicle through said wheel;

instrumentation operatively associated with said scale weighing platform and having output signals of amplitude variable in response to said dynamic force phenomena; and control means including memory for retaining a calibrating datum acquired in response to the static application of a known calibrating weight to said weighing platform, responsive to said output signals representing the presence of said wheel in movement, upon said platform for deriving the weight equivalent value of said dynamic force substantially independent of the velocity of said vehicle, and for deriving the value of said vehicle weight as a correlation of said calibrating datum with said derived weight equivalent value.

8. The apparatus of claim 7 in which said scale platform natural frequency when unloaded is selected as greater than about 70 Hz.

9. The apparatus of claim 7 in which said control means is responsive to a substantially peak amplitude value of said output signals for deriving said weight equivalent value of said dynamic force.

10. The apparatus of claim 7 in which said control means includes a converter stage responsive to said output signals for effecting the conversion thereof to digital signals at a sampling rate selected having a frequency effective for deriving said weight equivalent value.

11. The apparatus of claim 10 in which said sampling rate is at least twice said platform natural frequency.

12. The apparatus of claim 7 which said control means includes filter means responsive to said output signals for blocking components of said output signals having frequencies corresponding with said platform natural frequency.

13. The apparatus of claim 7 in which:
said instrumentation is configured for providing said output signals as load cell derived and in analog form;
said control means includes:
a first analog filter stage responsive to said output signals for blocking components thereof having frequencies corresponding with said platform natural frequency to provide filtered analog signals,
a converter responsive to said filtered analog signals for effecting the conversion thereof to digital signals at a sampling rate selected having a frequency effective to permit identification of said weight equivalent value, and
a digital signal processor responsive to said digital signals and said memory retained calibrating datum for deriving said weight equivalent value of said dynamic force and effecting the application of said calibrating datum to derive the value of said vehicle weight.

14. A method for determining the weight of a vehicle while in motion, said vehicle being supported by pneumatic wheels for movement upon a surface along a given path, comprising the steps of:
providing a scale having a weighing platform at said surface, exhibiting a select minimum natural frequency and positioned to receive a said wheel in weighing relationship during said vehicle motion;
providing instrumentation operatively associated with said scale having output signals variable in response to the imposition of a force to be weighed upon said weighing platform;
acquiring said output signals corresponding to the movement of said wheel upon said weighing platform;
converting said output signals to digital values at a sampling rate selected as effective to derive a select digital value correlative of the weight imposed by said wheel upon said weighing platform substantially independent of the velocity of said vehicle motion;
acquiring said select digital value; and converting said select digital value to a weight value by application of a calibrating factor thereto.

15. The method of claim 14 in which said conversion sampling rate is selected as at least twice said natural frequency.

16. The method of claim 14 in which said conversion sampling rate is selected as about at least 3000 conversions per second.

17. The method of claim 14 in which said select digital value acquired represents substantially a peak amplitude of said output signals.

18. The method of claim 14 in which said scale is provided having a said natural frequency selected as greater than about 70 Hz.

19. A method for determining the weight of a vehicle while in motion along a given path, such vehicle being movably supported by wheels in contact with a surface, comprising the steps of:
providing a scale having a weighing platform at said surface exhibiting a natural resonant frequency greater than about 70 Hz, and positioned to receive a said wheel in said weighing relationship during said vehicle motion;
providing instrumentation operatively associated with said scale having output signals of amplitude variable in response to the imposition of force upon said weighing platform;
calibrating said scale by applying known weight to said weighing platform and correlating corresponding said output signals thereto to derive a calibrating datum;
acquiring said output signals in response to the movement of a said vehicle wheel over said weighing platform;
determining a weight equivalent value from said acquired output signals;
deriving the said weight of said vehicle by correlating said weight equivalent value with said calibrating datum; and
outputting said weight value to a readout.

20. A method for determining the weight of a vehicle while in motion along a given path, such vehicle being movably supported by wheels in contact with a surface, comprising the steps of:
providing a scale having a weighing platform at said surface exhibiting a select minimum natural resonant frequency and positioned to receive a said wheel in weighing relationship during said vehicle motion;
providing instrumentation operatively associated with said scale having a digital converter stage deriving output signals of amplitude variable in response to the imposition of force upon said weighing platform at a sampling rate of at least twice said natural resonant frequency;
calibrating said scale by applying known weight to said weighing platform and correlating corresponding said output signals thereto to derive a calibrating datum;
acquiring said output signals in response to the movement of a said vehicle wheel over said weighing platform;
determining a weight equivalent value from said acquired output signals;
deriving the said weight of said vehicle by correlating said weight equivalent value with said calibrating datum; and
outputting said weight value to a readout.

21. The method of claim 20 in which said sampling rate is selected as about 3,000 sample updates per second.

22. A method for determining the weight of a vehicle while in motion along a given path, such vehicle being movably supported by wheels in contact with a surface, comprising the steps of:
providing a scale having a weighing platform at said surface exhibiting a select minimum natural resonant frequency and positioned to receive a said wheel in weighing relationship during said vehicle motion;
providing instrumentation operatively associated with said scale having output signals of amplitude variable in response to the imposition of force upon said weighing platform and having a filter stage removing frequencies of said output signals above about 90% of said natural resonant frequency;
calibrating said scale by applying known weight to said weighing platform and correlating corresponding said output signals thereto to derive a calibrating datum;
acquiring said output signals in response to the movement of a said vehicle wheel over said weighing platform;
determining a weight equivalent value from said acquired output signals;
deriving the said weight of said vehicle by correlating said weight equivalent value with said calibrating datum: and
outputting said weight value to a readout.

23. Apparatus for determining the weight of a vehicle moving along a given path such vehicle being movably supported by wheels in contact with a surface, comprising:
a scale having a weighing platform locatable at said surface and along said path in an orientation for receiving a said wheel in weighing relationship, said platform being configured to exhibit a natural frequency effective to transmit substantially all dynamic force imposed thereon by said vehicle through said wheel, said natural frequency being greater than about 70 Hz when said scale is unloaded;
instrumentation operatively associated with said scale weighing platform and having output signals of amplitude variable in response to said dynamic force phenomena; and
control means including memory means for retaining a calibrating datum acquired in response to the application of a known calibrating weight to said weighing platform, responsive to said output signals representing the presence of said wheel upon said platform for deriving the weight equivalent value of said dynamic force, and for deriving the value of said vehicle weight as a correlation of said calibrating datum with said derived weight equivalent value.

24. Apparatus for determining the weight of a vehicle moving along a given path such vehicle being movably supported by wheels in contact with a surface, comprising:
a scale having a weighing platform locatable at said surface and along said path in an orientation for receiving said wheel in weighing relationship, said platform being configured to exhibit a minimum natural frequency effective to transmit substantially all dynamic force imposed thereon by said vehicle through said wheel;
instrumentation operatively associated with said scale weighing platform and having output signals of amplitude variable in response to said dynamic force phenomena; and
control means including memory for retaining a calibrating datum acquired in response to the application of a known calibrating weight to said weighing platform, having a converter stage responsive to said output signals representing the presence of said wheel upon said platform for effecting the conversion thereof to digital signals at a sampling rate of at least twice said platform natural frequency for deriving the weight equivalent value of said dynamic force, and for deriving the value of said vehicle weight as a correlation of said calibrating datum with said derived weight equivalent value.

25. The apparatus of claim 24 in which said sampling rate is about 3000 Hz.

26. Apparatus for determining the weight of a vehicle moving along a given path such vehicle being movably supported by wheels in contact with a surface, comprising:
a scale having a weighing platform locatable at said surface and along said path in an orientation for receiving a said wheel in weighing relationship, said platform being configured to exhibit a minimum natural frequency effective to transmit substantially all dynamic force imposed thereon by said vehicle through said wheel;
instrumentation operatively associated with said scale weighing platform and having output signals of amplitude variable in response to said dynamic force phenomena; and
control means including memory for retaining a calibrating datum acquired in response to the application of a known calibrating weight to said weighing platform, and filter means for blocking components of said output signals having frequencies corresponding with said platform natural frequency, responsive to said filtered output signals representing the presence of said wheel upon said platform for deriving the weight equivalent value of said dynamic force, and for deriving the value of said vehicle weight as a correlation of said calibrating datum with said derived weight equivalent value.

27. Apparatus for determining the weight of a vehicle moving along a given path such vehicle being movably supported by wheels in contact with a surface, comprising:
a scale having a weighing platform locatable at said surface and along said path in an orientation for receiving a said wheel in weighing relationship, said platform being configured to exhibit a minimum natural frequency effective to transmit substantially all dynamic force imposed thereon by said vehicle through said wheel;
instrumentation operatively associated with said scale weighing platform and having load cell derived output signals in analog form and of amplitude variable in response to said dynamic force phenomena; and
control means including:
memory for retaining a calibrating datum acquired in response to the application of a known calibrating weight to said weighing platform.

a first analog filter stage responsive to said output signals for blocking components thereof having frequencies corresponding with said platform natural frequency to provide filtered analog signals, a converter responsive to said filtered analog signals for effecting the conversion thereof to digital signals at a sampling rate selected having a frequency effective to permit identification of a weight equivalent value of said dynamic force, and a digital signal processor responsive to said digital signals and said memory retained calibrating datum for deriving said weight equivalent value of said dynamic force and deriving the value of said vehicle weight as a correlation of said calibrating datum with said derived weight equivalent value.

28. The apparatus of claim 13 in which said control means includes a digital low pass filter for limiting candidate digital signals to filtered values representing weight data.

29. The apparatus of claim 28 in which said control means derives said weight equivalent value as the peak of said filtered values.

30. The apparatus of claim 28 in which said digital low pass filter is a low pass filter excluding said candidate digital signals above about 90% of said scale natural frequency.

31. A method for determining the weight of a vehicle while in motion, said vehicle being supported by pneumatic wheels for movement upon a surface along a given path, comprising the steps of:

providing a scale having a weighing platform at said surface, exhibiting a select minimum natural frequency and positioned to receive a said wheel in weighing relationship during said vehicle motion;

providing instrumentation operatively associated with said scale having output signals variable in response to the imposition of a force to be weighed upon said weighing platform;

acquiring said output signals corresponding to the movement of said wheel upon said weighing platform;

converting said output signals to digital values at a sampling rate selected as at least twice said natural frequency to derive a select digital value correlative of the weight imposed by said wheel upon said weighing platform;

acquiring said select digital value; and converting said select digital value to a weight value by application of calibrating factor thereto.

32. A method for determining the weight of a vehicle while in motion, said vehicle being supported by pneumatic wheels for movement upon a surface along a given path, comprising the steps of:

providing a scale having a weighing platform at said surface, exhibiting a natural frequency selected as greater than about 70 Hz and positioned to receive a said wheel in weighing relationship during said vehicle motion;

providing instrumentation operatively associated with said scale having output signals variable in response to the imposition of a force to be weighed upon said weighing platform;

acquiring said output signals corresponding to the movement of said wheel upon said weighing platform;

acquiring said select digital value; and converting said select digital value to a weight value by application of a calibrating factor thereto.

* * * * *

UNITED STATES PATENT AND TRADEMARK OFFICE
CERTIFICATE OF CORRECTION

PATENT NO. : 5,002,141

DATED : March 26, 1991

INVENTOR(S) : Richard C. Loshbough et al.

Page 1 of 2

It is certified that error appears in the above-indentified patent and that said Letters Patent is hereby corrected as shown below:

Columns 21 and 22, as shown on the attached page, should be inserted after columns 19 and 20

Signed and Sealed this

Thirty-first Day of May, 1994

Attest:

BRUCE LEHMAN

Attesting Officer

Commissioner of Patents and Trademarks weight equivalent value of said dynamic force substantially independent of the velocity of said vehicle, and for deriving the value of said vehicle weight as a correlation of said calibrating datum with said derived weight equivalent value.

8. The apparatus of claim 7 in which said scale platform natural frequency when unloaded is selected as greater than about 70 Hz.

9. The apparatus of claim 7 in which said control means is responsive to a substantially peak amplitude value of said output signals for deriving said weight equivalent value of said dynamic force.

10. The apparatus of claim 7 in which said control means includes a converter stage responsive to said output signals for effecting the conversion thereof to digital signals at a sampling rate selected having a frequency effective for deriving said weight equivalent value.

11. The apparatus of claim 10 in which said sampling rate is at least twice said platform natural frequency.

12. The apparatus of claim 7 which said control means includes filter means responsive to said output signals for blocking components of said output signals having frequencies corresponding with said platform natural frequency.

13. The apparatus of claim 7 in which:
said instrumentation is configured for providing said output signals as load cell derived and in analog form;
said control means includes:
a first analog filter stage responsive to said output signals for blocking components thereof having frequencies corresponding with said platform natural frequency to provide filtered analog signals,
a converter responsive to said filtered analog signals for effecting the conversion thereof to digital signals at a sampling rate selected having a frequency effective to permit identification of said weight equivalent value, and
a digital signal processor responsive to said digital signals and said memory retained calibrating datum for deriving said weight equivalent value of said dynamic force and effecting the application of said calibrating datum to derive the value of said vehicle weight.

14. A method for determining the weight of a vehicle while in motion, said vehicle being supported by pneumatic wheels for movement upon a surface along a given path, comprising the steps of:
providing a scale having a weighing platform at said surface, exhibiting a select minimum natural frequency and positioned to receive a said wheel in weighing relationship during said vehicle motion;
providing instrumentation operatively associated with said scale having output signals variable in response to the imposition of a force to be weighed upon said weighing platform;
acquiring said output signals corresponding to the movement of said wheel upon said weighing platform;
converting said output signals to digital values at a sampling rate selected as effective to derive a select digital value correlative of the weight imposed by said wheel upon said weighing platform substantially independent of the velocity of said vehicle motion;
acquiring said select digital value; and
converting said select digital value to a weight value by application of a calibrating factor thereto.

15. The method of claim 14 in which said conversion sampling rate is selected as at least twice said natural frequency.

16. The method of claim 14 in which said conversion sampling rate is selected as about at least 3000 conversions per second.

17. The method of claim 14 in which said select digital value acquired represents substantially a peak amplitude of said output signals.

18. The method of claim 14 in which said scale is provided having a said natural frequency selected as greater than about 70 Hz.

19. A method for determining the weight of a vehicle while in motion along a given path, such vehicle being movably supported by wheels in contact with a surface, comprising the steps of:
providing a scale having a weighing platform at said surface exhibiting a natural resonant frequency greater than about 70 Hz, and positioned to receive a said wheel in said weighing relationship during said vehicle motion;
providing instrumentation operatively associated with said scale having output signals of amplitude variable in response to the imposition of force upon said weighing platform;
calibrating said scale by applying known weight to said weighing platform and correlating corresponding said output signals thereto to derive a calibrating datum;
acquiring said output signals in response to the movement of a said vehicle wheel over said weighing platform;
determining a weight equivalent value from said acquired output signals;
deriving the said weight of said vehicle by correlating said weight equivalent value with said calibrating datum; and
outputting said weight value to a readout.

20. A method for determining the weight of a vehicle while in motion along a given path, such vehicle being movably supported by wheels in contact with a surface, comprising the steps of:
providing a scale having a weighing platform at said surface exhibiting a select minimum natural resonant frequency and positioned to receive a said wheel in weighing relationship during said vehicle motion;
providing instrumentation operatively associated with said scale having a digital converter stage deriving output signals of amplitude variable in response to the imposition of force upon said weighing platform at a sampling rate of at least twice said natural resonant frequency;
calibrating said scale by applying known weight to said weighing platform and correlating corresponding said output signals thereto to derive a calibrating datum;
acquiring said output signals in response to the movement of a said vehicle wheel over said weighing platform;
determining a weight equivalent value from said acquired output signals;
deriving the said weight of said vehicle by correlating said weight equivalent value with said calibrating datum; and
outputting said weight value to a readout.